United States Patent
Kerr et al.

(10) Patent No.: US 10,911,680 B2
(45) Date of Patent: Feb. 2, 2021

(54) METHOD AND SYSTEM OF GEOLOCATION AND ATTITUDE CORRECTION FOR MOBILE ROLLING SHUTTER CAMERAS

(71) Applicant: Intel Corporation, Santa Clara, CA (US)

(72) Inventors: Gregoire Kerr, Germering (DE); Zoran Zivkovic, Hertogenbosch (NL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/235,715

(22) Filed: Dec. 28, 2018

(65) Prior Publication Data
US 2019/0158716 A1   May 23, 2019

(51) Int. Cl.
| H04N 5/232 | (2006.01) |
| H04N 5/353 | (2011.01) |
| G06T 3/00 | (2006.01) |
| G06T 7/80 | (2017.01) |
| G06T 5/00 | (2006.01) |
| G06T 7/13 | (2017.01) |
| G06T 7/00 | (2017.01) |
| G06T 7/70 | (2017.01) |

(52) U.S. Cl.
CPC .......... H04N 5/2329 (2013.01); G06T 3/0093 (2013.01); G06T 5/006 (2013.01); G06T 7/0002 (2013.01); G06T 7/13 (2017.01); G06T 7/70 (2017.01); G06T 7/80 (2017.01); H04N 5/232 (2013.01); H04N 5/23258 (2013.01); H04N 5/3532 (2013.01); *G06T 2207/30168* (2013.01); *G06T 2207/30244* (2013.01)

(58) Field of Classification Search
CPC ............... H04N 5/2329; H04N 5/3532; H04N 5/23258; H04N 5/232; G06T 7/70; G06T 5/006; G06T 2207/10032; G06T 3/0093; G06T 7/80
See application file for complete search history.

(56) References Cited

U.S. PATENT DOCUMENTS

| 2014/0160309 | A1* | 6/2014 | Karpenko | ............... G11B 27/11 348/208.6 |
| 2014/0218569 | A1* | 8/2014 | Tsubaki | ............... H04N 5/2329 348/241 |
| 2016/0360081 | A1* | 12/2016 | Tsubaki | ............. H04N 5/23264 |
| 2018/0359419 | A1* | 12/2018 | Hu | ..................... H04N 5/23238 |

OTHER PUBLICATIONS

Devernay, F. et al., "Straight lines have to be straight: automatic calibration and removal of distortion from secnes of structured environments", Machine Vision and Applications Springer Verlag, 2001, 13 (1), pp. 14-24.

Karpenko, A. et al., "Digital Video Stabilization and Rolling Shutter Correction using Gyroscopes", Stanford Tech Report, CTSR Mar. 2011, Sep. 2011, 7 pages.

(Continued)

*Primary Examiner* — Ahmed A Berhan
(74) *Attorney, Agent, or Firm* — Green, Howard & Mughal LLP.

(57) ABSTRACT

A method, system, and article is directed to geolocation and attitude correction for mobile rolling shutter cameras.

25 Claims, 14 Drawing Sheets

(56) References Cited

OTHER PUBLICATIONS

Opencv, "Camera calibration with OpenCV", OpenCV 2.4.13.17 documentation; Retrieved online via docs.opencv.org/2.4/doc/tutorials/calib3d/camera_calibration/camera_calibration.html on Apr. 5, 2019, 13 pages.
PIX4D, "Improved accuracy for rolling shutter cameras", https://www.pix4d.com/blog/rolling-shutter-correction, Apr. 20, 2016, 9 pages.
Wikipedia, "Cross-correlation", retrieved online via https://en.wikipedia.org/wiki/cross-correlation on Apr. 5, 2019, 7 pages.
Wikipedia, "Sobel operator", Retrieved online via en.wikipedia.org/wiki/Sobel_operator on Apr. 5, 2019, 9 pages.
Ximea, "Sensor Shutter Modes", Sensor Shutter Modes, All products, ximea support; retrieved online via https://www.ximea.com/support/wiki/allprod/sensor_shutter_modes on Apr. 5, 2019, 3 pages.

* cited by examiner

FIG. 1
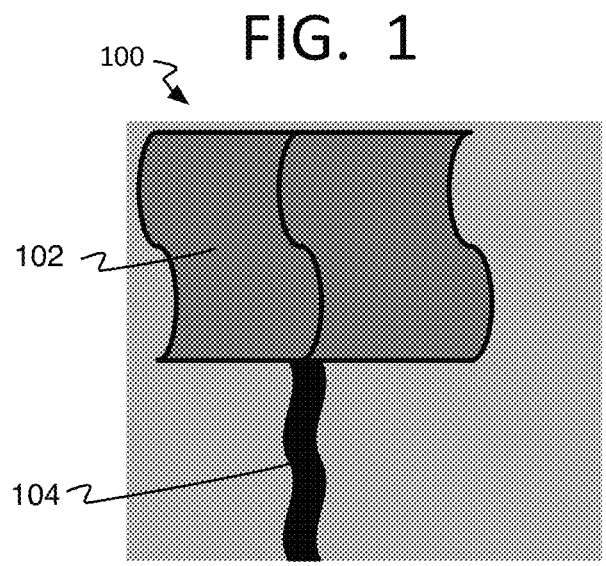
FIG. 2
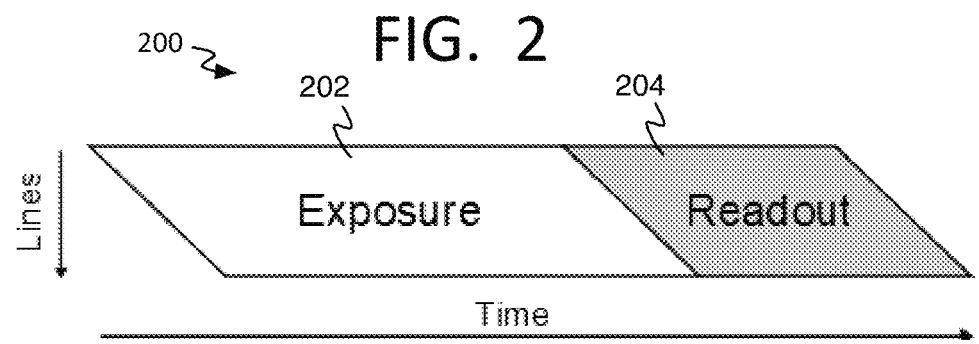
FIG. 3A  FIG. 3B
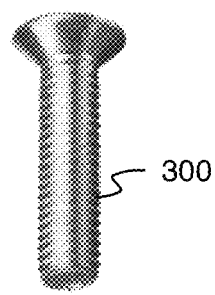 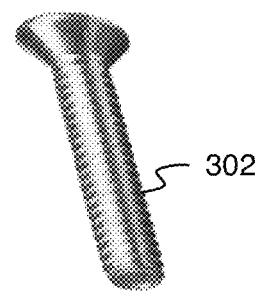

```
CAPTURE IMAGE DATA OF AT LEAST ONE FRAME
WITH A ROLLING SHUTTER OF AT LEAST ONE
MOVING CAMERA 402
            │
            ▼
DETERMINE ROW-BASED DISTORTIONS OF INDIVIDUAL
ROLLING SHUTTER ROWS OF PIXEL IMAGE DATA FORMING A
PART OF THE FRAME BY USING THE IMAGE DATA AND THAT
INDICATE A DIRECTION OF TRAVEL OR ATTITUDE OF THE
CAMERA WHEN THE ROLLING SHUTTER ROW CAPTURED A
CORRESPONDING PART OF THE FRAME 404
   ┌ ─ ─ ─ ─ ─ ─ ─ ─ ─ ─ ─ ─ ─ ─ ─ ─ ─ ─ ─ ─ ┐
     DETERMINE THE DISTORTION AS A GRADIENT-RELATED
     VALUE OF INDIVIDUAL ROLLING SHUTTER ROWS 406
   └ ─ ─ ─ ─ ─ ─ ─ ─ ─ ─ ─ ─ ─ ─ ─ ─ ─ ─ ─ ─ ┘
            │
            ▼
CORRELATE THE ROW-BASED DISTORTIONS WITH SENSED
CAMERA PARAMETER DATA OF ONE OR MORE PARAMETERS OF
THE AT LEAST ONE MOVING CAMERA TO DETERMINE A BEST
CORRELATION TO FORM A CORRELATED TIMELINE 408
   ┌ ─ ─ ─ ─ ─ ─ ─ ─ ─ ─ ─ ─ ─ ─ ─ ─ ─ ─ ─ ─ ┐
     TEMPORALLY CORRELATE A TIMELINE OF THE
     DISTORTIONS WITH A TIMELINE OF THE SENSED
     CAMERA PARAMETER DATA 410
   └ ─ ─ ─ ─ ─ ─ ─ ─ ─ ─ ─ ─ ─ ─ ─ ─ ─ ─ ─ ─ ┘
            │
            ▼
CORRECT THE IMAGE DATA OF THE FRAME BY USING THE
CORRELATED TIMELINE 412
```

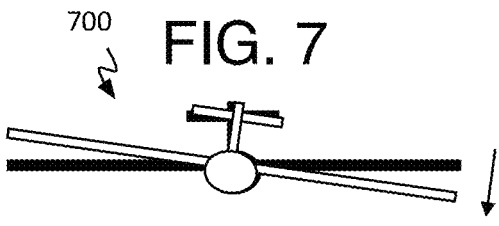
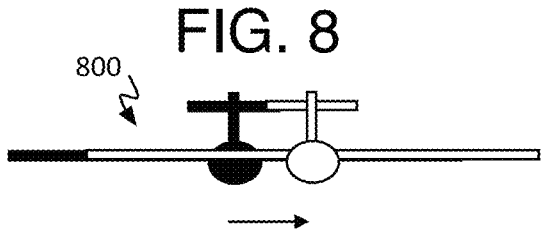
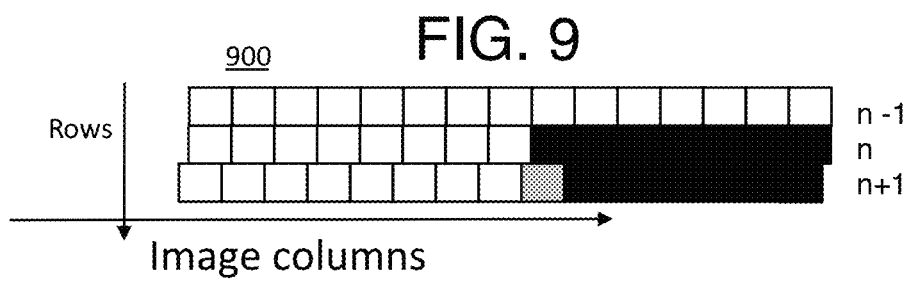
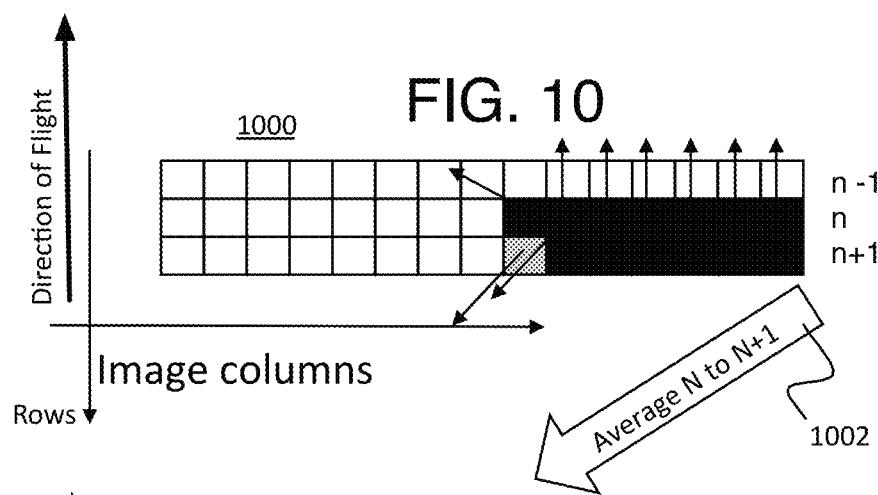
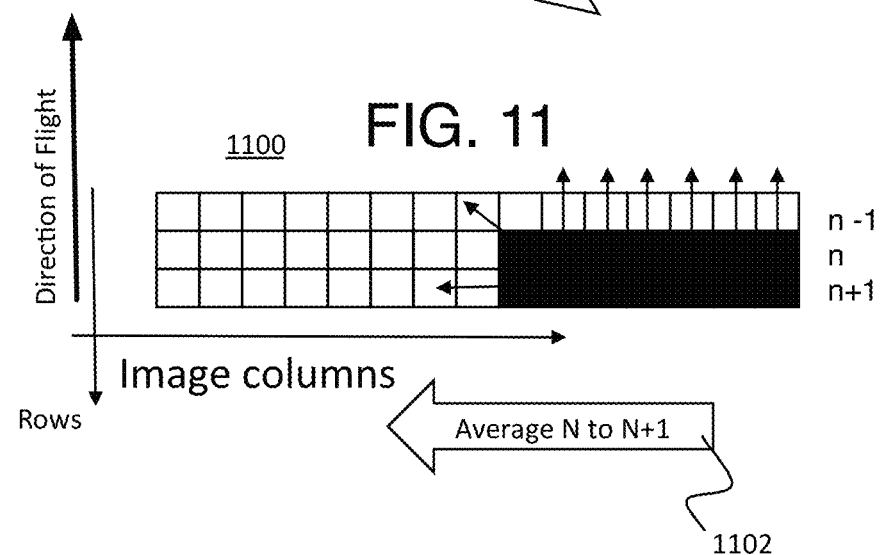

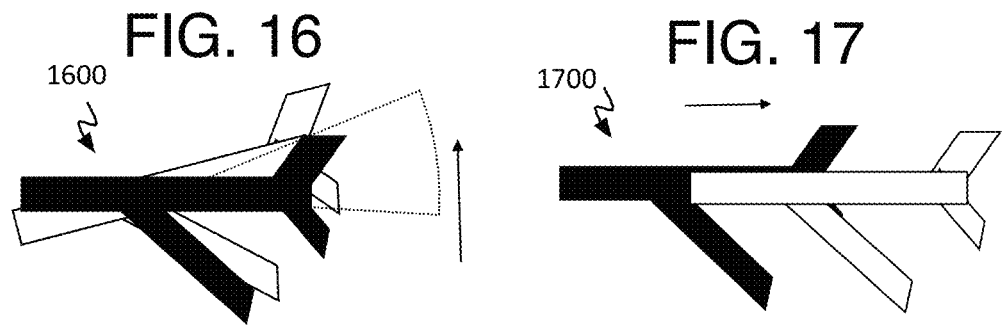
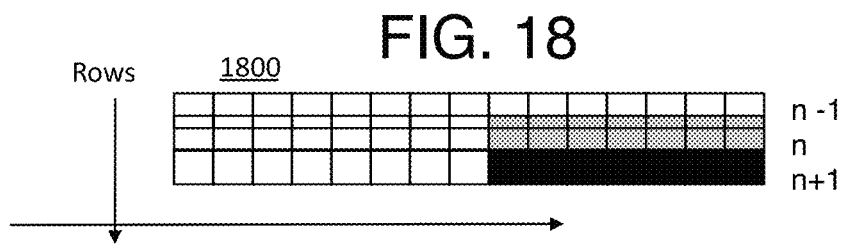
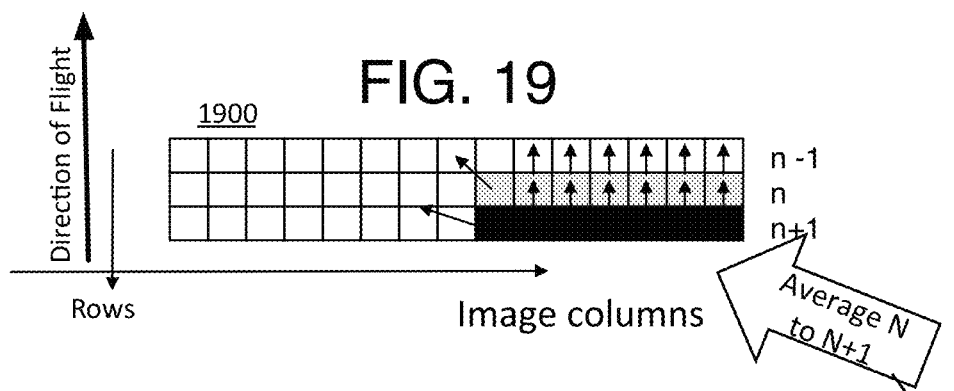
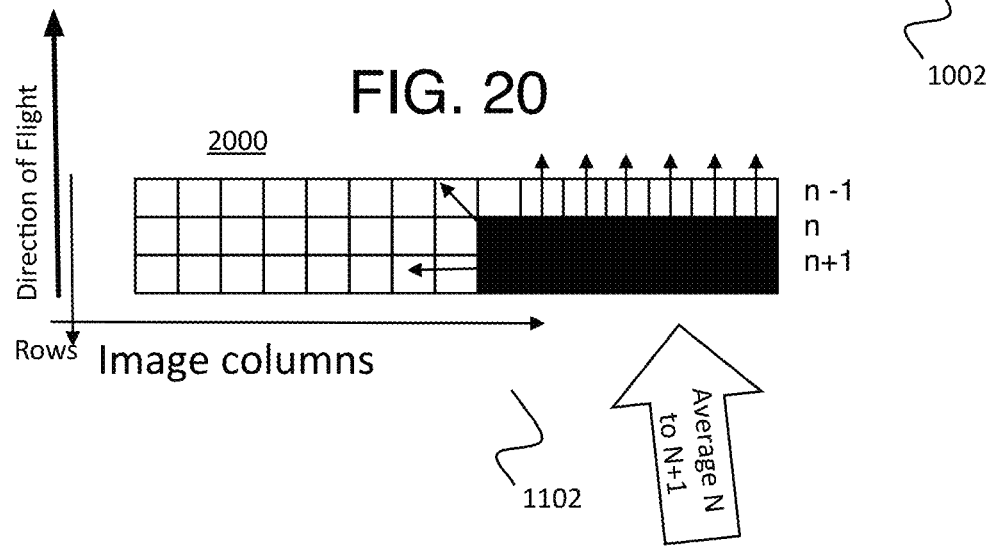

US 10,911,680 B2

METHOD AND SYSTEM OF GEOLOCATION AND ATTITUDE CORRECTION FOR MOBILE ROLLING SHUTTER CAMERAS

BACKGROUND

Many mobile camera systems, such as unmanned aerial vehicles (UAVs) or drones are now in use to capture images of objects or events to use the images to build a 2D or 3D representation of the objects or events for measurement or to provide different virtual perspectives of the object or event. This may include mobile cameras on drones that are used to perform inspections to inspect an object such as a building, bridges, or wind mills for example, where it is difficult for a person to inspect, or to perform survey whether for small areas of land such as at a construction site or for large areas such as for surveying a city. Other uses for mobile camera systems that are used to construct 3D representations include the recording of sporting events or concerts at stadiums, arenas, stages, and so forth.

Some of these mobile camera systems are required to provide high precision representations such as to within a few centimeters or less. One such high-precision geo-localization system is real-time-kinematics (RTK) for global navigations satellite systems (GNSS). In order to achieve such precision, the system must know the exact location and pose (pose is referred to herein as attitude or orientation as well) of the camera at the exact moment an image is captured. This allows points of one image to be registered to that of another image to form the 3D models or to be geo-referenced.

These mobile cameras, however, often provide inaccuracies in geolocation and attitude because a delay may occur from the time the capture of an image is triggered to the time the image is actually captured by the camera such as by an exposure start time point for an image. The delay may be caused by transmission of the trigger instructions from a remote location, and otherwise the time to process the request and start the image capture. The location and attitude of the camera are typically provided to the mobile camera separately by sensors such as global position systems (GPSs) and gyroscopes respectively and recorded at the time of the trigger. The time of the sensed position and attitude is typically recorded for a trigger time. Thus, this separation between sensor capture time and camera capture time creates an asynchronization that results in 3D reconstruction errors or image projection and/or object measurement errors.

One contributing factor to the delay is rolling shutters. A rolling shutter starts the exposure and read-out of image lines separately, and one after another, so a further delay occurs from the time of the exposure on the first line of the image to the last line of the image, further lengthening the delay, and potentially adding to the difference in recorded versus actual image geolocation and attitude. This is especially true when the geolocation computations are computed by assuming the image was captured at a single instance in time despite the use of the rolling shutter.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a diagram of an image showing the results of a camera in a roll or cross-translation motion while capturing the image;

FIG. 2 is a schematic diagram of for operation of a rolling shutter;

FIG. 3A is an image obtained from a rolling shutter camera that is not moving;

FIG. 3B is an image obtained from a rolling shutter camera that is moving from side to side;

FIG. 4 is a flow chart of a method of geolocation and attitude correction for rolling shutter cameras in accordance with at least one of the implementations herein;

FIG. 7 is a schematic diagram showing a roll rotation direction;

FIG. 8 is a schematic diagram showing a cross-track translation direction;

FIG. 9 is a schematic diagram showing the effects of roll or cross-track translation distortion on a pixel footprint;

FIG. 10 is a schematic diagram showing distorted roll or cross-track translation gradient indications in accordance with at least some implementations of the present disclosure;

FIG. 11 is a schematic diagram showing non-distorted roll or cross-track translation horizontal gradient indications in accordance with at least some implementations of the present disclosure;

FIG. 16 is a schematic diagram showing a pitch rotation direction;

FIG. 17 is a schematic diagram showing an along-track translation direction;

FIG. 18 is a schematic diagram showing the effects of pitch or along-track translation distortion on a pixel footprint;

FIG. 19 is a schematic diagram showing distorted pitch or along-track translation gradient indications in accordance with at least some implementations of the present disclosure;

FIG. 20 is a schematic diagram showing non-distorted pitch or along-track translation vertical gradient indications in accordance with at least some implementations of the present disclosure;

DETAILED DESCRIPTION

Figure 5A:
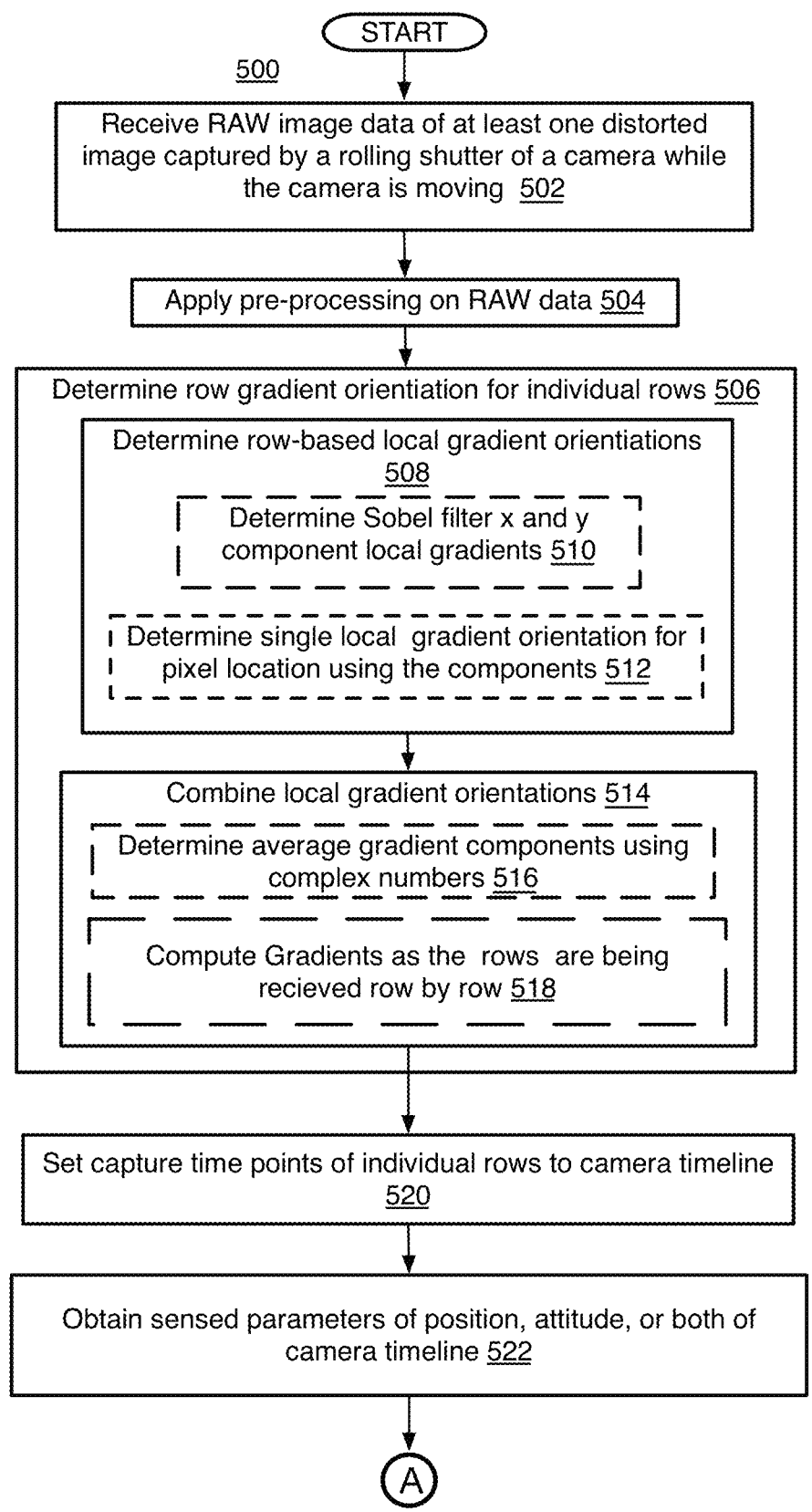
FIGS. 5A-5B is a detailed flow chart of geolocation and attitude correction for rolling shutter cameras in accordance with at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (Sock) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer or commercial electronic (CE) devices such as drones or other remotely controlled cameras, vehicle mounted cameras, wearable personal or point of view (POV) cameras, smartphones, dedicated cameras, laptop computers, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of geolocation and attitude correction for mobile rolling shutter cameras.

As mentioned, some 2D or 3D camera systems that capture images of a scene and use the position and attitude of the camera to relate or construct 3D representations of the scene require very high accuracy within a few centimeters in some cases. These systems, however, have synchronization difficulties when a delay occurs between the actual triggering of the image capture (referred to as the trigger-command time or just trigger time) and the time that the camera actually captures the image.

Referring to FIG. 1, and particularly, many known mobile cameras have sensors such as a global positioning system (GPS) to determine the geolocation (or position or just location) of the camera, and a gyroscope or other sensor to detect the attitude (roll, pitch, and yaw) of the camera. The sensors often record (or log) the position and attitude of the camera at the time the image capture is triggered rather than when the image is actually captured by camera sensors. This can introduce a significant error in calculations that use both the image data and the sensed (or actual) position and/or attitude of the moving camera and that is assumed to form the corresponding image. For example, when a drone is flying at a standard speed of 10 m/s (about 22 mph), a synchronization error of 100 ms between the trigger time and actual capture time would lead to a distance of 1 m between the actual position of the camera and the theoretical assumed position for the corresponding image. This error is unacceptable when using RTK and GNSS for example.

As to the capturing of the images on the mobile camera, the use of rolling shutters adds further to these distortions. The use of rolling shutters rather than global shutters is common for these UAV drone or other mobile camera systems, and is used with many complementary metal-oxide-semiconductor (CMOS)-based shutters for example. Specifically, a conventional global shutter exposes all lines in a frame at the same time and then reads one line after the other thereby creating a very clear clean time-wise break of data between frames. While exposure of all lines at the same time reduces geometric distortions, the global shutters suffer from lower imaging capacities, typically at a lower signal-to-noise ratio (SNR).

Referring to FIG. 2, rolling shutter sensors on the other hand, acquire data line by line as shown on rolling shutter operation 200 where the line by line exposures 202 along a time line represent the rolling or stepped start of exposure for each line (or each rolling shutter row when one row has more than one pixel line) with a corresponding readout 204 of each pixel line (or rolling shutter row) after the exposure 202. Thus, all rolling shutter rows, each with at least one pixel line of an image or frame, start exposing at different points in time and one after the other in a rolling manner. A read-out at the end of each exposure also is performed in the same rolling manner.

Referring to FIG. 1, the rolling shutter operations, however, contribute image deformations when the camera still is moving while the rolling shutter is capturing an entire image so that the camera may have a different position and/or attitude from one rolling shutter row to the next. In some cases, the difference in exposure start from one row (or pixel line) to the next row (or pixel line) can be 70 μs, which can result in an additional difference in position of 0.7 cm when the camera is moving 10 m/s for example, and in addition to the trigger delay which may already be present. This causes further artefacts that affect the quality of resulting images or 3D models, and this is especially true when the camera is moving in varying directions and/or varying speeds while a single image is being captured. An image 100 provides an example of resulting image distortion from rolling shutters and shows an overhead view of a roof 102 and driveway of a residential home 104 distorted from side to side due to cross-track roll or translation of the camera while capturing the single image 100.

Referring to FIGS. 3A-3B for example, if the sensor is moved during acquisition in a direction perpendicular to its columns, a vertical line will be imaged as being slightly diagonal as shown in this example of a screw with the correct image 300 and image 302 distorted by the motion of the camera during the rolling shutter operation (see for example, "Sensor Shutter Modes", Ximena, www.ximea.com/support/wiki/allprod/Sensor_Shutter_Modes).

Conventional attempts to resolve these issues have been inadequate. As for synchronizing the camera sensors to actual image capture times, a known trial and error method includes performing a number of iterations with several different manually set synchronization offsets between trigger time and candidate capture times, and then selecting the offset with the best results in 3D reconstruction or other image processing. This offset estimation is a time intensive activity. When using cameras which exhibit different exposure timing from row to row (or pixel line to pixel line) on a single image, it is not feasible. Even when using cameras which have a stable shutter timing for all rows of an image, however, the offset estimation is often too slow and complicated.

For inspection tasks where a drone is used to inspect a certain object, these synchronization errors are typically not addressed at all, such that synchronization errors are often the bottle neck, e.g., when trying to register observed features to a given structure. For surveying tasks, where a drone is used to survey relatively large areas of land, these errors are typically addressed when stitching the imagery from different images (or frames) together. This may be performed while refining the recorded picture position so that the time points of the inter-images can be overlapped correctly. While the refinement might result in more accurate synchronization, it also often results in over-tuning one or more parameters so that the synchronization process is unable to correct unstable (i.e. varying) synchronization errors that have not been experienced before.

As for the rolling shutter distortion itself, it is usually merely considered a minor nuisance. Some stitching engines such as pix4D include a simplified correction operation. Such rolling shutter corrections usually include some sort of simple correction such as assuming a constant and uniform speed of the camera during acquisition. This often results in imprecise synchronization and corrections, and in turn, significant errors.

To resolve these issues, the present method and system uses the rolling shutter geometric distortions of a mobile camera, such as a camera on a drone, to improve image trigger synchronization, and in turn the precision of the geolocation and attitude tracking along a camera timeline while the camera is recording (or capturing) images. The method herein can achieve a rolling shutter row by row (or image pixel line by pixel line) precision. It will be noted that some rolling shutters have multiple pixel image lines in a single rolling shutter row that is exposed at the same time. Herein, however, the examples assume each pixel line has its own rolling shutter row, although it need not always be configured that way for the present geolocation and attitude synchronization method to work.

The line-by-line camera position and attitude tracking is accomplished by correlating the geometric distortions found in image data generated by rolling shutter sensors (and the trigger delay) to the sensed (or herein referred to as the actual) camera parameters such as the position or attitude or both of the camera. The position and attitude of the camera, and in turn vehicle carrying the camera, such as a drone, may be referred to herein as camera or sensed parameters that include the roll, pitch, and yaw of the camera, as well as the translation in along-track direction which is parallel to the direction of flight, and the cross-track (or across-track) direction which is side-to-side or transverse to the direction of flight. Correlating the image data to the sensed data in turn correlates an image data distortion timeline (the time points of the start of capture or exposure of each line) to a sensed parameter timeline (the logged flight sensed parameter data) to generate a single correlated timeline. Once such correlation is achieved, the position and attitude of the camera at the start of capture of each row can be determined as well as the correct trigger time that commands the start of capturing a frame and relative to the actual start of capture or exposure time of each row.

The distortion can be provided in the form of a representative image data row gradient orientation of each or individual rows. By one form, the row gradient orientation is an average gradient orientation of local pixel-based gradients along the same row. It has been determined that gradient orientations of image data sufficiently represent distortion caused by motion of the camera whether by rolling shutter distortion or trigger time distortion so that correlation of the gradient orientations along time and correlated to the sensed position and attitude data accurately reveal the position and/or attitude of the camera for a certain gradient orientation of a row.

Once the correlated timeline is established, techniques have been created as described herein that use the correlated positions or attitudes or both with a warping matrix to correct the distorted images. An edge-based linear-regression type of technique is used to set a trigger time for the warping matrix computations when the trigger time is not already provided when generating the correlated timeline. The details are provided below.

Referring to FIG. 4, an example process 400 of geolocation and attitude correction for mobile rolling shutter cameras described herein is arranged in accordance with at least some implementations of the present disclosure. In the illustrated implementation, process 400 may include one or more operations, functions or actions as illustrated by one or more of operations 402 to 412 numbered evenly. By way of non-limiting example, process 400 will be described herein with reference to image processing system 2900 (FIG. 29) described herein and where relevant.

Process 400 may include "capture image data of at least one frame with a rolling shutter of at least one moving camera" 402. In one example, a camera or image sensor may provide image data in the form of one or more captured frames and that is input to one or more processors such as an image signal processor (ISP). Frame herein interchangeably refers to an image or picture and may include image data of individual photographs or frames of a video sequence.

Process 400 may include "determine row-based distortions of individual rolling shutter rows of pixel image data forming a part of the frame and by using the image data and that indicate a direction of travel or attitude of the camera when the rolling shutter row captured part of the image data" 404. As explained herein, image data distortions of a rolling shutter row, which may be one or more pixel rows, can indicate the direction (or position) and attitude of the camera while the row was captured (or during exposure of the sensor pixels of the row). By one form, this operation may include "determine the distortion as a gradient-related value of individual rolling shutter rows" 406. Specifically, it was determined that representative gradients, including at least the gradient orientation but also may include the gradient intensity (which is a difference in intensity or brightness between two different sides of the gradient), of a single row may indicate the position or attitude or both of the camera capturing the image data. In one example, the local gradients of a row are determined by using horizontal and vertical Sobel filters to determine x and y local gradient components of a pixel location. These components are combined for each pixel to form a single gradient orientation for a pixel location, and then these pixel local gradient orientations are combined, such as by averaging the gradients in the form of complex numbers, to form a single row gradient (or gradient orientation). The result is at least a row gradient orientation angle (or additionally a row gradient intensity as well) that indicates a distortion in the image data caused by a change in position or attitude of the camera while the row was captured.

Process 400 may include "correlate the row-based distortions with sensed camera parameter data of one or more parameters of the at least one moving camera to determine a best correlation to form a correlated timeline" 408. Here, a cross-correlation equation may be used without converting the two different data sets to the same parameter-type. The rise and fall of the gradient values relative to each other on one hand, and the rise and fall of sensed camera parameter values relative to each other on the other hand, are compared to determine a correlation. This is performed by testing different lag times between the two datasets until a best correlation is reached that is the absolute greatest correlation. Optionally, process 400 may include "temporally correlate a timeline of the distortions to a timeline of the sensed camera parameter data" 410. Thus, when the trigger time relative to row capture (or exposure) start times can be determined ahead of time, the domain of the correlation, and in turn, lag time used, may be limited to a time at least partly based on a delay time from the trigger time to the capture time of the row being analyzed. Other details are provided below. The result is a correlated timeline that indicates the position or attitude or both of the camera when a particular row was captured.

Process 400 may include "correct the image data of the frame by using the correlated timeline" 412, and once the correlation timeline is established, the correct trigger time for the frame may be determined if not done so already, and if needed to correct the image data or further applications. The trigger time and row positions and/or attitudes then may be used to correct the distorted image data, and by one form, by determining and applying a warping matrix as described below. When the trigger time is not computed during correlation operations, candidate trigger times may be tested to determine which time provides the lowest distortion error. The details are provided below.

Figure 5B:
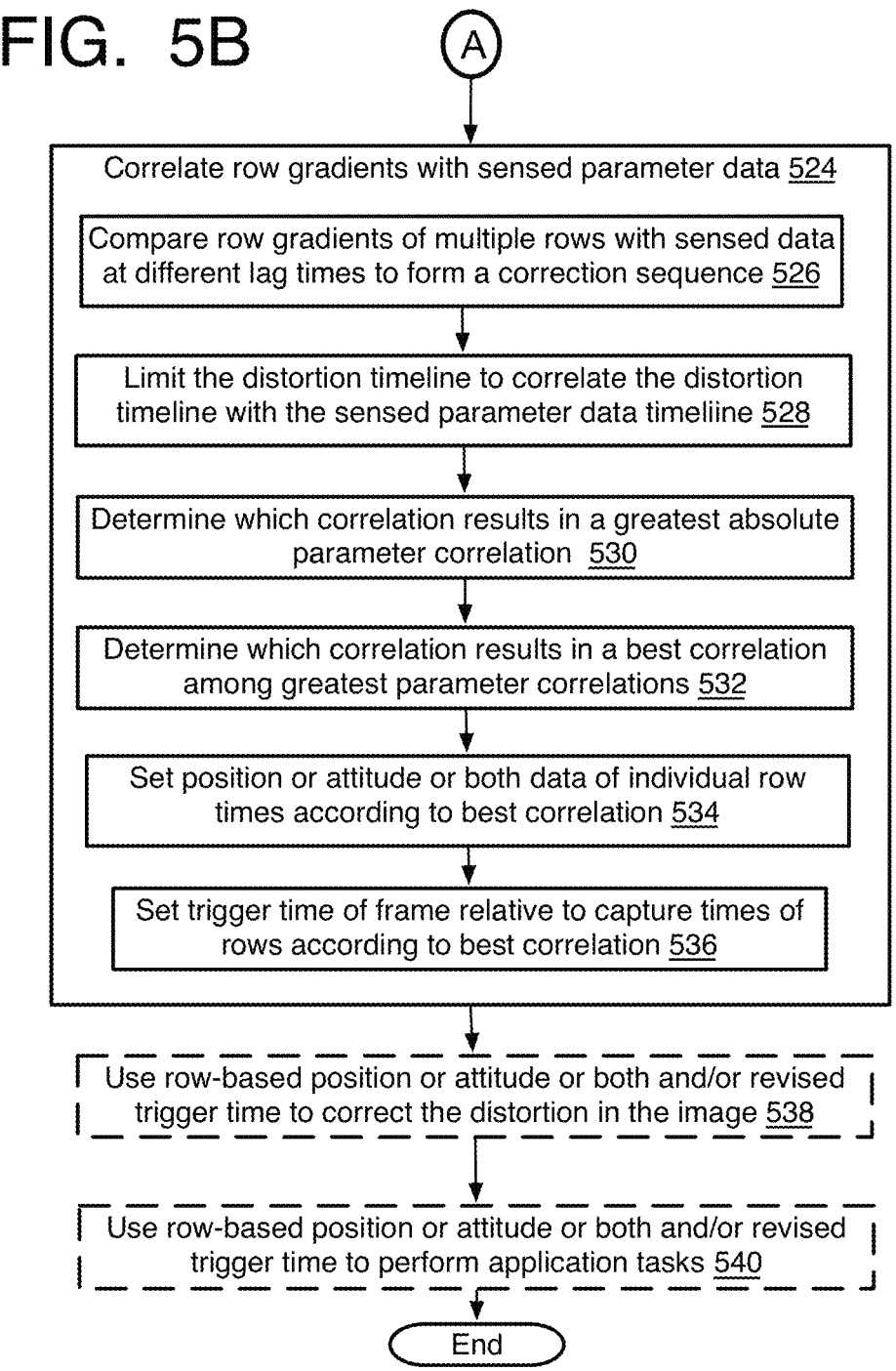
Figure 6:
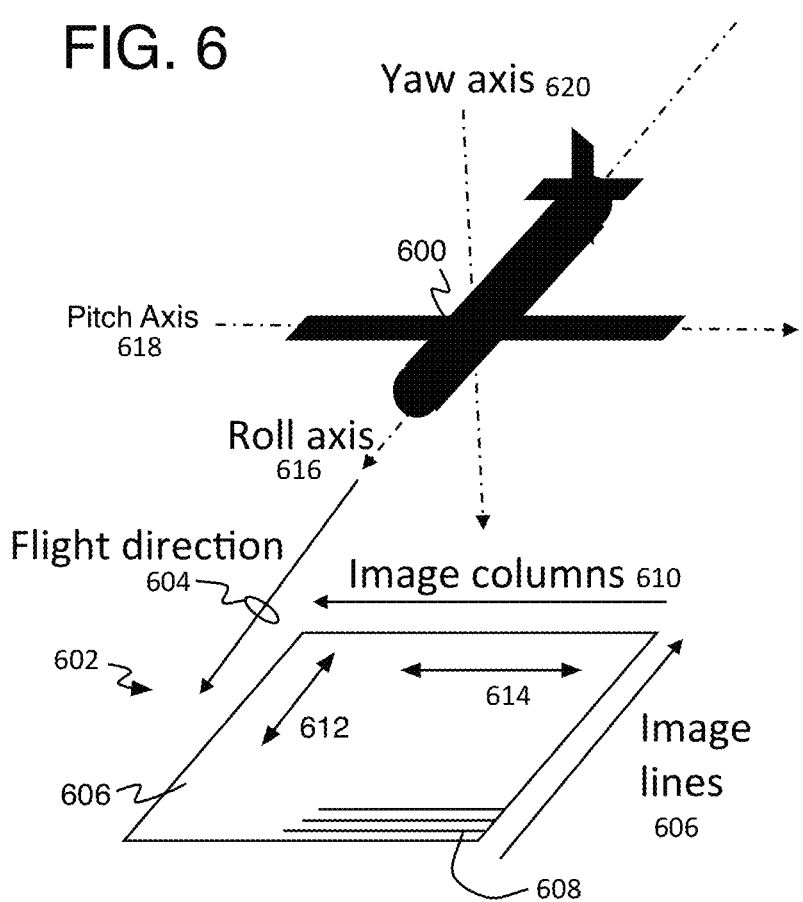
FIG. 6 is a schematic diagram to show attitude directions relative to an image being captured by a camera on a mobile device according to the implementations herein.

Referring to FIGS. 5A-5B, an example process 500 of geolocation and attitude correction for mobile rolling shutter cameras described herein is arranged in accordance with at least some implementations of the present disclosure. In the illustrated implementation, process 500 may include one or more operations, functions or actions as illustrated by one or more of operations 502 to 540 numbered evenly. By way of non-limiting example, process 500 may be described herein with reference to image processing system 2900 (FIG. 29) described herein and where relevant.

Process 500 may include "receive raw image data of at least one distorted image captured by a rolling shutter of a camera while the camera is moving" 502. In one example, a camera or image sensor may provide image data in the form of captured frames and that is placed in a bit stream of an input system and that is provided to one or more processors such as an image signal processor (ISP).

Process 500 may include "apply pre-processing on raw image data" 504, and may include noise reduction, pixel linearization, and shading compensation. It also may include resolution reduction, Bayer demosaic, and/or vignette elimination, and so forth. Any pre-processing may be performed that sufficiently prepares the image data for the correlation operations.

Process 500 may include "determine row gradient orientation for individual rows" 506. As mentioned, gradient orientations of the image data can indicate the motion distortion of the camera. Specifically, image data generated by a camera can be very complex and can indicate, or be the result of, many different types of distortions, such as motion blur and other optic distortions related to the point-spread function (PSF) to name a few examples. In order to conclude that a row gradient can indicate a distortion from a change in position or attitude of the camera is first based on a number of assumptions: (1) some structure exists in the scene, and (2) the structures are, at scale, usually much smaller than the image dimensions, such as with survey or inspection tasks performed by a camera on a drone for example. Thus, both assumptions are very reasonable in practice. The first assumption is that an area without any structure (or at least texture) wouldn't be of interest when performing a survey or inspection flight. The second being that a flight path, and in turn optics and/or sensors used, are chosen prior to the flight to be covering the area of interest. Under these two hypotheses, it also can be reasonably assumed that the image will be (locally) displaying a seemingly random (uniformly distributed, uniformly oriented)

distribution of gradients. Thus, a systematic or consistent bias in the gradient direction over a certain minimum area that makes it appear that the gradients are in other than a random distribution is most likely to originate from the rolling shutter and trigger time delay distortions.

In addition, on a global scale, borders between objects on the image, such as between background (sky for example) and foreground (buildings for example) may produce local linear borders at the scale of a few pixels that contribute to the overall gradient budget but at very small amounts. Thus, with the assumptions mentioned above such that the scale of observation (i.e., the whole frame) is much greater than the scale of details being observed, the line-to-line curvature radius of the object(s) in the image is likely to form smaller distortions than the rolling shutter. Even though some unusually shaped man-made structures might be able to significantly influence the row gradient orientation, then such gradient is unlikely to be correlated to the flight control sensed data and is very likely to be ignored.

Referring to FIGS. 6-21 as to the specific gradient indications, examples are provided to show how certain camera position and attitude parameters may be indicated by specific gradient orientation directions. The examples assume a typical drone or flying vehicle 600 camera (or camera sensor) configuration 602 (FIG. 600). In this example, the camera on the vehicle 600 is acquiring an image while the camera is moving in a flight direction 604 and has its optical axis pointed downward so that a sensor pixel array 606 of the camera, and in turn resulting image pixels, has sensor pixel lines (and in turn image pixel lines) 608 that run transverse to the direction of flight 604 and columns 610 that run parallel to the direction of flight. The camera sensor array 606 may be mounted at the bottom of the vehicle or other location at the axes (616, 618, 620 shown as center lines) intersection or other known location relative to the axes.

The first row or pixel line is at the top of the resulting image (as a person would look at the image) and top of the sensor array 606. Thus, the top of the sensor array 606 and the image is the forward end here relative to the direction of flight 604 and front of the drone, and the bottom of the sensor image 606 and resulting image forms the back end of the sensor array relative to the direction of flight 604. As mentioned, the along-track translation refers to motion parallel to the direction of flight 604 and up and down (or front and back) on the pixel sensor array 606 as shown by arrow 612. Cross-track translation refers to motion transverse to the direction of flight 604 and side-to-side on the pixel sensor array 606 and resulting image as shown by arrow 614. A roll axis 616 is the center of roll rotation, and the roll axis is parallel to both the sensor array 606 and the flight direction 604, while a pitch axis 618 is the center of pitch rotation and is parallel to the sensor array 606 but transverse or perpendicular to the direction of flight 604. A yaw axis 620 is transverse to both the image sensor array and the flight direction 604. It should be noted that this is one simple example configuration, but many other configurations would work as well including a camera pointed out of a side of a vehicle that captures elevation views or any other attitude, and the camera also may be fixed so that only the motion of the vehicle can change the position or attitude of the camera, or may be able to move about the attitude axes or on other axes or planes. The configuration of the camera mounting is not limited with regard to the quality of the correlation as long as precise sensed parameters can be obtained.

Continuing now with the example, FIGS. 7-11 show a likely row gradient orientation, such as an average, in the case of a roll or cross-track translation. Thus, an example front view of vehicles 700 and 800 each with a camera as mentioned for vehicle 600 and in a roll or cross-track translation respectively, which both have a similar distortive effect on the image data. Specifically, an example simplified pixel footprint 900 that is a representation of a portion of the resulting image includes three rolling shutter rows or pixel lines (row or line n−1, n, and n+1). Foot print 900 covers a very simplified example at one small corner of an object on an image, but in reality, the image would be much more complex with up to thousands or more pixels in a single line. Each small square is a pixel location, and the difference in shading reflects a difference in intensity (or brightness but could be a difference in color as well). As shown, rotation of the camera along the flight direction (roll) or cross-track translation will induce a side-to-side offset between one pixel line (or rolling shutter row) n and a next pixel line (or row) n+1 so that the distortion of the image data will result in an image where it appears as if the pixel locations are not correctly aligned in columns. Thus, for the roll, or cross-track translation, line by line pixels will be mismatched along the row or pixel line axis (which is a line forming the pixels in the row or pixel line) or in other words, image data on a pixel on one line will be matched to the wrong image data of a pixel on another line resulting in a bias gradient orientation.

Referring to FIG. 10, a pixel area 1000 shows the same pixel area as that of foot print 900 except here arrows show the normal to the direction of gradient orientation and the length of the arrows represent the gradient intensity. The pixel diagram 1000 show the result of bias due to the shift between pixel lines as shown on the footprint 900 and resulting in the gradient biased very close to the same parallel direction along the row and upward (or rearward) locally and where the gradient is in the wrong opposite direction. Normally, the local gradients should be pointing in the direction from lighter intensity to darker intensity. Here instead, the distortion or bias has created the opposite gradient orientation direction from dark to light pixel intensities. The small diagonal arrows merely reflect pixels at a corner of an object in the content of the image. The result is an average or row gradient orientation 1002 that points diagonally toward a pixel (or row) line (or axis) and/or diagonally downward (or rearward) relative to the direction of flight.

Referring to FIG. 11, the gradients are shown in the same pixel area 1100 as footprint 900 except now without the distortion. The corrected row gradient orientation 1102 is shown here to be pointed in a direction that is parallel to the rows or pixel lines because the gradient orientations between lines n and n+1 consist of 'zeros' (actually no values) except for the border pixel displaying a horizontal gradient. It should be noted that the resulting average gradient direction is for a small subset region that is shown (and the left edge of the dark area). Actually, gradients should be random as mentioned when inspecting the full line and when free of distortion. Thus, if extending the image to the 'other side' or right side along the row of the black patch, the opposite local gradient will be present along the same row and the two opposite average directions should cancel each other.

Referring to FIGS. 12-15, example resulting gradients are provided for a yaw motion, and the notation and representations are the same as that of the roll and cross-track example. Here, a top view of a vehicle 1200, and in turn its camera, is shown in an example yaw motion turning about a yaw axis (into and out of the paper here). A footprint 1300 shows that rotation around the vertical axis (yaw) will cause a rotation between a current line n and the previous/next line n+1 for example. In the case of yaw, the line by line pixel rotation results in a linear shift of the gradient orientations between each line.

For yaw, the average row gradient orientation is not rotated. However, it will still vary along the pixel line as shown on pixel diagram 1400, and the resulting average row gradient orientation 1402 is null. Pixel diagram 1500 shows the resulting gradients in the corrected image with the row gradient orientation null as well. Only linear shift would be present. Handling yaw is more complex than the other parameters and so is not favored for the calculations. More details are provided below.

Referring to FIGS. 16-20, an example resulting row gradient is provided for a pitch or along-track translation example. Thus, an example side view of vehicles 1600 and 1700 each with a camera as mentioned for vehicle 1600 is shown in a pitch or along-track translation respectively, which both have a similar distortive effect on the image data. Rotation around the pitch axis will induce an overlap of the current line n with the previous or next line n+1 as shown on footprint 1800 for example. Thus, in the case of pitch or along-track translation, line by line pixels will be mismatched along the line axis as described previously. As a result, the local gradients as shown on pixel diagram 1900 will point in the wrong direction and will have the wrong intensities due to the overlap or image date pixels. The result is an average gradient direction 1902 that points slightly forward relative to the direction of flight and mainly toward and along (or more parallel to) the row or pixel line axis and more perpendicular to the direction of flight. The diagram 2000 shows the corrected image with the average gradient orientation pointing forward more parallel to the direction of flight.

Translation of the camera in the height axis (along the yaw axis 620 (FIG. 6)) during a rolling shutter capture may change the resolution, but the resulting distortion is usually negligible and need not be addressed here.

With these examples, it is shown that motion of the camera is likely to cause a bias in pixel line or row gradient in a certain direction that can be determined with sufficient accuracy to match changes in sensed or actual position or attitude to the changes in row gradients as follows.

To determine a row gradient orientation for individual rows, process 500 first may include "determine row-based local gradient orientations" 508, and this operation may include "determine Sobel filter x and y component local gradients" 510. Thus, local image gradient orientations, which are actually gradients among, or between, pixels of multiple pixel lines, can be computed from line to line. For example, using a Sobel filter of size 3×3 pixels on a pixel line (or row) may be centered at each or individual pixel locations along a row. Thus, by one form, the filter covers pixel locations above and below the current row being analyzed. Other alternatives could center the filter at another line to form the gradient of the current line. The Sobel filters are applied in two directions for each or individual pixel locations, horizontal and vertical, on the image to form local x and y component gradient orientations $\nabla_x$ and $\nabla_y$. This operation also applies Sobel filter smoothing of the gradient by using a Gaussian filter for example in order to remove and/or limit noise (see en.wikipedia.org/wiki/Sobel_operator). It will be appreciated that other types of gradient estimator could be used instead of a Sobel filter such as the Laplacian operator, the Prewitt operator, Savitzky Golay filter 1st order with any support size, and so forth.

Process 500 may include "determine single local gradient orientation for pixel location using the components" 512. By using the Sobel filter, as mentioned, the image may be convolved by both a vertical and horizontal Sobel filter, thereby retrieving respectively the local vertical gradient orientation $\nabla_y$ and the local horizontal gradient orientation $\nabla_x$ component of the total gradient orientation $\nabla l$. The local gradient orientation angle $\theta_l$ at a given pixel then can be estimated through 2d arc-tangent of local component gradients $\nabla_x$ and $\nabla_y$, while the local gradient amplitude $|\nabla_l|$ may be set at the norm $N=\sqrt{\nabla_x^2+\nabla_y^2}$. Using these values, the local gradient $\nabla_l$ can be expressed as a complex number $N e^{i\theta_l}$ where $i^2=-1$. This value is retrieved on a pixel basis. It should be noted that the average horizontal and vertical components of a pixel line could be computed first, and then arctan could be used to determine the combined or average gradient of a pixel line (or row).

Process 500 may include "combine local gradient orientations" 514. It has been found that changes from row to row of an average of the local gradients $\nabla_l$ in a single row adequately represents the motion of the camera. Other combinations than an average could be used as well such as a median (or other quantiles/percentiles) as well as any estimator suitable for extracting a trend out of noisy data (e.g. Bayesian estimator, Kalman/particle filters, etc.

By one form then, process 500 may include "determine average gradient components using complex numbers" 516. Specifically, averaging angles can be complicated due to their periodicity. One example way to avoid these problems is to express the row gradient $\nabla_o$ as a complex number a+bi, with the modulus being the gradient intensity (or amplitude and norm of the complex number) of the gradient, and the argument being the average gradient orientation. Averaging (summing these complex values and dividing the result by the amount of pixels in a row) over each line provides the 'average gradient' as a complex number. Thus, expressing the local gradients $\nabla_l$ as a complex value and then averaging these complex values results in a complex number whose argument can be seen as the average row gradient orientation $\nabla_o$. In addition, the modulus can be used to rule out homogeneous areas that exhibit random orientation and a small modulus, thus leading to smaller modulus of their mean. The modulo operator is applied to the results to keep the results in [0; 180] thus giving us $\nabla_o$ as described above.

It will be noted that instead of working with the full orientations, i.e. ranging from zero to 360 degrees, only modulo 180 degrees is accounted for. Thus, the local orientation of the gradient will indeed be inverted depending on which side of a given object a pixel location is. For example, in FIG. 1, both sides of the home 104 can have an outward facing gradient, having a 180 degree phase shift between them.

It will be understood that row gradient orientation $\nabla_o$ is a function of time because it also is line dependent such that each image line (or rolling shutter row) can have a different value of $\nabla_o$. However, as this approach focuses on a rolling shutter sensor, each line will be acquired slightly delayed from the previous line (so-called line delay). As the line delay is known for a given sensor (with a given configuration), each line can be associated with a time delay from the initial (first) line.

Accordingly, the rolling shutter gradient orientation changes as a function of time relative to the first rolling shutter row (or pixel line) and for t=0 where the first row is designated as $R_o$, and where the last row of the image is $R_{max0}$. The row gradient orientation can be designated as:

$$\nabla_o : \begin{cases} [R_0; R_{max}] \to [0; 180[ \\ t \to \nabla_0(t) \end{cases} \quad (1)$$

where $\nabla_o$ is the average gradient orientation (with modulo 180 for the average gradient orientation), and for a single row (or pixel line). The top terms set the minimum and maximum of both the domain and definition domain for row gradient $\nabla_o$, while the bottom term indicates the value of $\nabla_o$ as the modulus 180 of the value of the gradient orientation at time t (designed as $\nabla_o(t)$). Each value of $\nabla_o$ of a row on a frame is then provided for correlation for that frame (in other words, where $\nabla_o$ is the map or function, while $\nabla_o(t)$ is the value of the function evaluated at t).

Yaw gradient orientation, however, will be defined slightly differently. In this case, after applying the Sobel filters, a least-square fitting may be used for both center of rotation and slope to minimize the distance from the gradient vectors from the line defined by the center of rotation and slope (with initialization on the UAV rotation center as defined by a flight-controller and angle of yaw=0). In other words, the yaw rotation will be tracked by taking advantage of the linear variation of the gradients amplitudes away from the rotation center. The 'mean orientation' of the gradient then being the retrieved slope. One possible implementation uses the same equation (1) here as well.

Process 500 may include "compute gradients as the rows are being received row by row" 518, and by one example, the processing continues with computing row gradient orientation as soon as the image data of the rows needed for computing the gradients is available, holding only the needed rows in buffers while computing the correlations. It is also possible, when all lines were already recovered, to compute gradients of each line in parallel.

Figure 21:
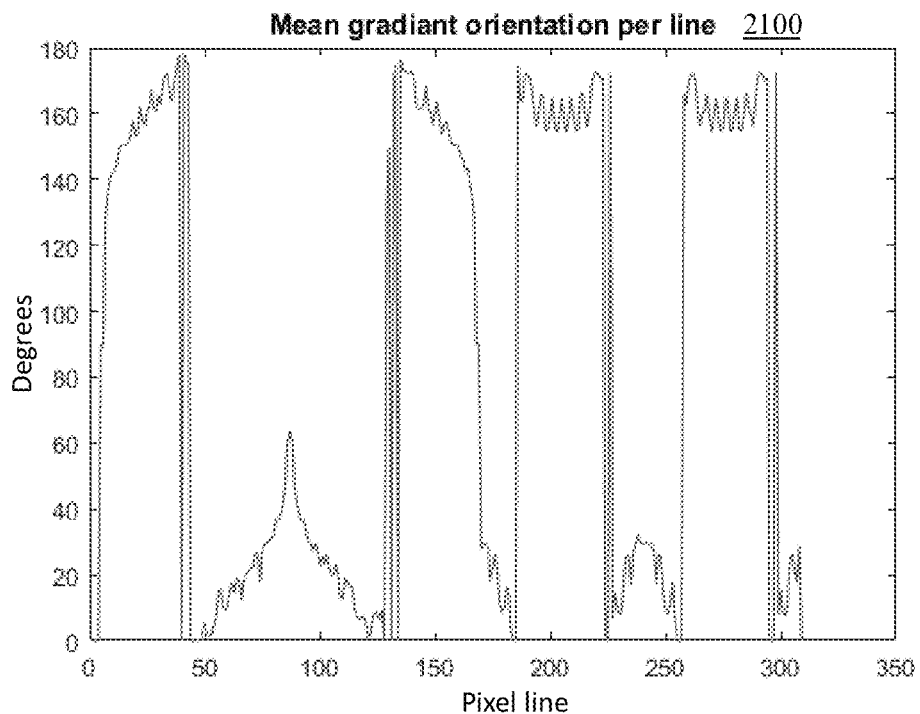
FIG. 21 is a chart showing resulting average gradients per pixel line in accordance with at least some implementations of the present disclosure.

Referring to FIG. 21, a chart 2100 shows results of the gradient computations with row or average (mean) gradient orientation per row or pixel line, here up to 350 pixel lines, while less or more pixel lines may form an image. In the examples present herein, images with 3648 pixel lines may be used for standard resolution images, while 4K and UHD-1 images typically have 2160 pixel lines. Higher resolution sensors might display higher line numbers. The chart 2100 shows the gradient orientation of the distorted image 100 (FIG. 1) that is distorted from side to side by a roll motion or cross-track translation.

Process 500 may include "set capture time points of individual rows to camera timeline" 520. Thus, once the row gradients are determined, the row gradients are assigned to initial capture (or exposure) start times on the same camera timeline as the sensed camera parameter data and maintained in the order of the rows from the top to the bottom of the sensor array, and in turn top to bottom of the images. Particularly, in some cases, it is possible to obtain the start time of each row ahead of time when retrievable through latency tests or otherwise the timing may be known depending on the system. It should be noted the timing of the exposure of each row is not always exactly uniform and the differences in timing can be accounted for here. This assigns each row gradient a time that can be adjusted relative to the sensed parameter times by performing the correlation calculations explained below. The result of the resampling is to assigns rows $R_0$ to $R_{max}$ initial time points $T_0$ to $T_{max}$ on a timeline T with sensed data sample points at t. The sequence of time points of the row gradients, by themselves, may be considered a distortion timeline, while the time instances of the sensed camera parameters may be considered a sensed parameter timeline, such that the result of the correlation correlates these two timelines to each other to form a single correlated timeline as explained below as well.

Process 500 may include "obtain sensed parameters of position, attitude, or both of camera timeline as well as any additional parameter" 522. The sensed parameter (attitude and position) data provided by a vehicle such as a drone, or from the camera on the drone or other device, are typically sampled at a very high frequency, such as about 20 Hz (or samples/second), but could be as high as 10 kHz, or in other words, 0.1 to 50 ms intervals for each sample compared to approximately 0.02 ms between each row or pixel line capture. The sensed parameter data is saved in a memory (or logged) whether on the vehicle for later download or remotely transmitted to memory of another computer or server, either of which enables post-flight computation of the correlation when so desired.

In more detail, the sensed or actual roll (or pitch or translation) is another function of time ranging from $T_0$ (start of flight) when t=0, until $T_{end}$ (end of flight), where $T_{end}$ is much greater than $T_{max}$. It also should be noted that for translation, the domain would be $]-\infty; \infty[$, which does not, however, play any role in practice. Each sensed parameter being used may be set similarly as that for roll:

$$r : \begin{cases} [T_0; T_{end}] \to [-\pi/2; \pi/2] \\ t \to r(t) \end{cases} \quad (2)$$

where here r represents the roll as logged by a flight-controller and t is sample time along a sensed parameter timeline. Alternatively, or additionally, instead of, or in addition to, roll r, a pitch p, yaw y, cross-track translation $t_x$, along-track translation $t_y$, or any combination of these may be used, and each may be generated by a camera, or vehicle holding the camera, and logged. An equation similar to equation (2) may be used to set the sensed parameters, except that the domain may vary as mentioned.

Figure 22:
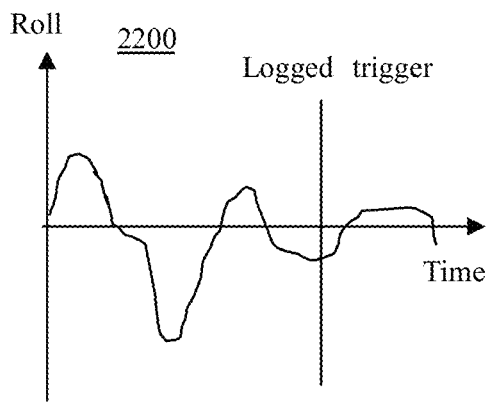
FIG. 22 is a graph showing sensed roll per time of a mobile camera in accordance with at least some implementations of the present disclosure.

Referring to FIG. 22, a graph 2200 shows an example aerial roll angle per time and logged for the vehicle carrying the camera that captured the image 100 (FIG. 1) for example. The original trigger time (the time point which is the command to perform the capture or exposure of a frame) is shown as well marking the sample time point and roll magnitude logged for the example frame or image 100. This is the data that may be provided for correlation.

Next, process 500 may include "correlate row gradients with sensed parameter data" 524. Specifically, in order to perform the correlation, such as a cross-correlation, a particular value for the location or attitude parameter (such as roll, pitch, or translation) of a particular rolling shutter row or pixel line of the image need not be computed to correlate the gradient orientations with the sensed parameter data. Thus, no direct conversion takes place from gradient orientation (or intensity) units to sensed camera parameter units, or vice-versa. Whether a direct conversion could take place is not relevant (it may or may not). Instead, cross-correlation is carried out by matching the relative rise and fall of some unit (such as gradient orientation degrees) and relative to itself, to a similar rise and fall of different parameter units, and relative to itself, of another set of data. Here, both datasets are based on time, which is convenient to ultimately form a correlated timeline for the two datasets as described below.

Process 500 may include "compare row gradients of multiple rows with sensed data at different lag times to form a correlation sequence" 526. This includes using gradient orientation data that indicate cross-track or along track translation as well as roll, yaw, and/or pitch to be (temporally) correlated with the gradient orientation data. The correlation equation can be used iteratively by varying a candidate lag time over a range of possible lag times to obtain a correlation sequence of candidate correlation values where each value represents the likelihood of the correlation at a certain lag time. The correlation can be performed as follows.

First, the average or row gradient orientation $\nabla_o$ can be extended beyond the initially defined domain recited above by further defining the domain as:

$$\nabla_{o(t)}(t) = 0 \text{ when } t \in ]-\infty; T_0[ \cup ]T_{max}; +\infty[ \quad (3)$$

then the correlation can be written as:

$$\rho_r: \begin{cases} [0; T_{end}] \to [-1; 1] \\ \tau \to \dfrac{\int_{T_0}^{T_{max}} \nabla_o(t) r(t-\tau) dt}{\int_{T_0}^{T_{max}} |\nabla_o(t)| dt \int_{T_0}^{T_{end}} |r(t)| dt} \text{ if } \left(0 \neq \int_{T_0}^{T_{max}} |\nabla_o(t)| dt \text{ and } 0 \neq \int_{T_0}^{T_{end}} |r(t)| dt\right) \\ \text{else } 0 \end{cases} \quad (4)$$

where the domain is ranges from 0 or $T_0$ (start of exposure (or capture) of first row and start of flight or sensed parameter timeline as well) to $T_{max}$ (start of exposure (or capture) of last row) so that roll correlation $\rho_r$ may have a value from −1 being perfect anti-correlation which refers to the fact that both effects were perfectly opposed, 1 is perfect correlation, and zero is the lack of correlation. Otherwise, $\tau$ is the candidate lag or displacement time from the gradient orientation timeline to the sensed parameter data timeline, $\nabla_o$ (t) is the gradient orientation at the sample time t, r(t) is the roll value at sample time t, $T_{end}$ is the end of the flight or sensed parameter timeline, and dt is merely the infinitesimal difference of time to balance the integration. Also, in order to account for the specific case, or in other words, where r (or $\nabla_0$ or p or y or $t_x$ or $t_y$) is constantly zero over multiple time points t, then the result is that the correlation $\rho_r$ itself also would be constantly zero ($\rho_r$=0).

The other sensed parameters, similar to roll, may have temporal correlation designations for pitch, yaw, cross-track translation, and along-track translation respectively as correlations $\rho_p$, $\rho_y$, $\rho_{tx}$ and $\rho_{ty}$ where the equation is the same as that for $\rho_r$ except for changing the variable notation.

Alternatively, in a more efficient form, process 500 also may include "limit the distortion timeline to correlate the distortion timeline to the sensed parameter data timeline" 528. As mentioned above, in some cases, it is possible to determine the row capture times (start of row capture or exposure) relative to the trigger-command time when it is known for a certain system or by latency tests. In this case, when it is possible to obtain an estimate (including some margins) of the maximum delays between a trigger-command time ($t_0$) and an actual image acquisition time (first row start of capture or exposure time) $t_i$ of a row, say a delay time of $+/-t_\delta$ of all rows (or pixel line) relative to the trigger-command time, then the domain of the correlation can be substantially reduced, thereby significantly reducing the computational load. In this case, the correlation can be further simplified to:

This latter form (equation (5) versus (4)) will be more robust as confining the search for maximum around the actual time point of the gradient orientation of a row.

Once a correlation sequence is obtained for each sensed parameter being considered (roll, yaw, pitch, cross-track translation, and/or along-track translation for example), process 500 may include "determine which correlation results in a greatest absolute parameter correlation" 530. Thus, the greatest correlation value (or likelihood) in the correlation sequence of each parameter is selected as the candidate for that parameter. The greatest absolute correlation is either a maximum (positive) value of the sequence or the minimum (negative) value of the sequence for a particular one of the parameters (r, p, y, tx, ty).

Process 500 then may include "determine which correlation results in best correlation among greatest parameter correlations" 532. By one form, when the correlation is obtained for each sensed parameter being tracked for the camera, and the greatest parameter correlation (or temporal correlation) is selected for each parameter, the time corresponding to the single absolute greatest correlation for the orientation and sensed data of a row (or pixel line) can be retrieved as the best correlation from:

$$\operatorname{argmax}_\tau(\max[\rho_r(\tau), \rho_p(\tau), \rho_y(\tau), \rho_{tx}(\tau), \rho_{ty}(\tau)]) \quad (6)$$

Figure 23:
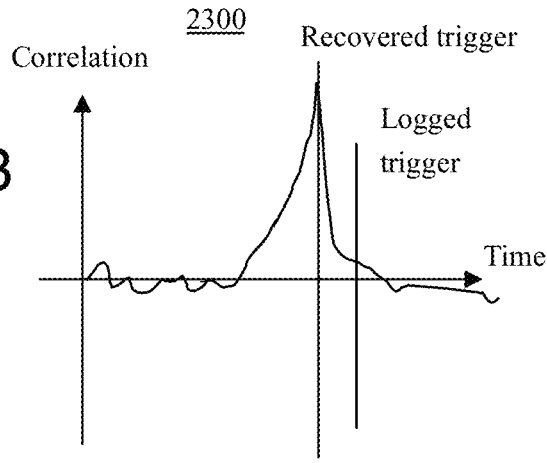
FIG. 23 is a graph showing resulting correlation per time in accordance with at least some implementations of the present disclosure.

Referring to FIG. 23, alternatively, it should be noted, that when only a single parameter is considered such as roll, only a single greatest absolute correlation is determined. A graph 2300 shows example correlation values of the single trigger time and per candidate trigger times to show how the trigger time moved. Note this does not show the correlation sequence. A correlation sequence includes single values each that summarize the matching of many points (or more accurately, the changes from point to point) of the two different datasets. For graph 2300 here, this simply shows a corrected trigger time versus an original logged trigger time in accordance with the correlation technique used herein. This may be the result of correlating the roll data of graph 2200 and the gradient orientations of graph 2100 both based on the distorted image 100 (FIG. 1).

Figure 24:
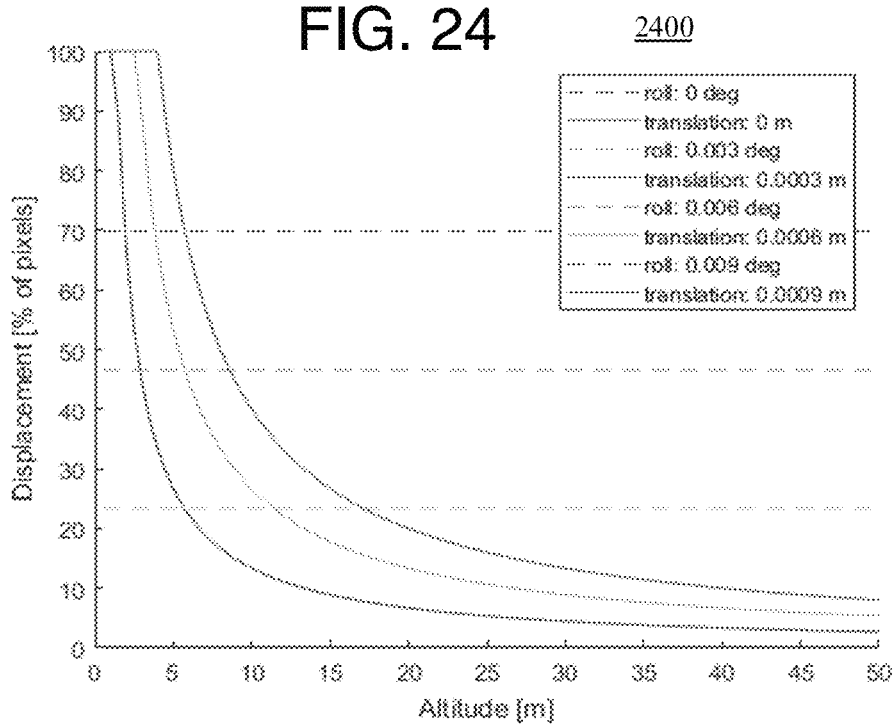
FIG. 24 is a graph showing resulting pixel displacement of shutter roll distortion based on attitude for aerial roll and sideways translation.
Figure 12:
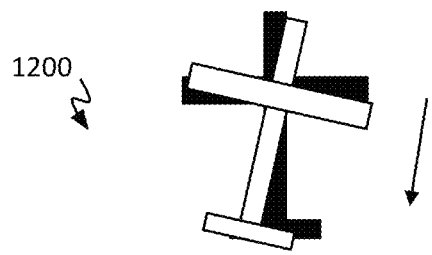
FIG. 12 is a schematic diagram demonstrating a yaw rotation direction.
Figure 13:
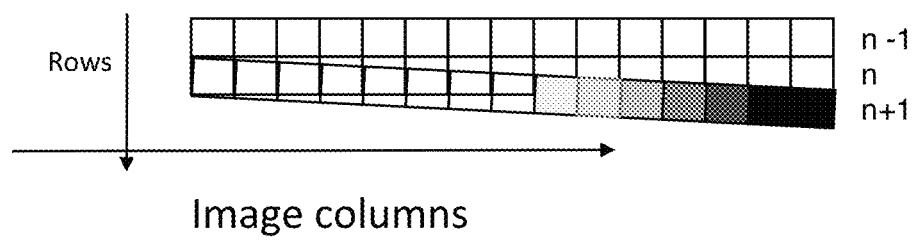
FIG. 13 is a schematic diagram showing the effects of yaw distortion on a pixel footprint.
Figure 14:
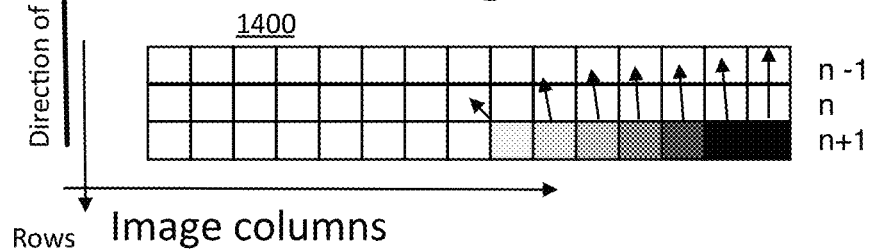
FIG. 14 is a schematic diagram showing distorted yaw gradient indications in accordance with at least some implementations of the present disclosure.
Figure 15:
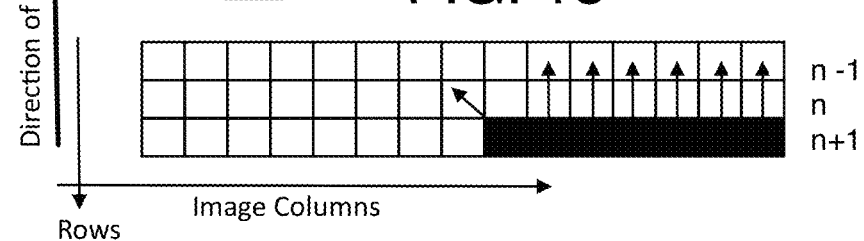
FIG. 15 is a schematic diagram showing non-distorted yaw vertical gradient indications in accordance with at least some implementations of the present disclosure.

It also may be noted that the attitude data provides better data versus the position (or translation) data when flying 'far' away from the target object to be captured in the images. Specifically, assuming typical frame speeds of a camera being used for the drone tasks mentioned herein, a relatively fast and large position (or translation) change would be required to noticeably impact the imagery when the camera is far from the target object, while even a small $$\rho_r: \begin{cases} [t_0 - t_\delta; t_0 - t_\delta] \to [-1; 1] \\ \tau \to \dfrac{\int_{T_0}^{T_{max}} \nabla_o(t) r(t-\tau) dt}{\int_{T_0}^{T_{max}} |\nabla_o(t)| dt \int_{T_0}^{T_{end}} |r(t)| dt} \text{ if } \left(0 \neq \int_{T_0}^{T_{max}} |\nabla_o(t)| dt \text{ and } 0 \neq \int_{T_0}^{T_{end}} |r(t)| dt\right) \\ \text{else } 0 \end{cases} \quad (5)$$

attitude change would involve a large displacement over the imagery. A graph 2400 (FIG. 24) discloses the impact of roll or horizontal translations on picture deformation for a sensor having a 20 mm focal-length and a 4.5 µm pixel pitch. It should be noted that in the presented implementations, the values of translation/rotation each curve relates to relate to a line to line deformation. For example, a line rate of 10 µs, would require a roll of 1E2 (deg/s) rotation speed would imply a rotation of 0.001 degree between two consecutive lines. Thus, attitude data may be used without using the translation data by one approach.

Then, process 500 may include "set position or attitude or both data of individual row times according to best correlation" 534, and "set trigger time of frame relative to capture times of rows according to best correlation" 536. Thus, the result of the correlation equations is a specific correct start time of the row (including the first row) and the position and/or attitude of the camera at each of those time points depending on which parameters were tracked, thus providing a corrected synchronization of the acquisition. The correct trigger time of the frame also can be determined when the latency or delay to the row capture times is known as mentioned above.

Process 500 may include "use row-based position or attitude or both and/or revised trigger time to correct the distortion in the image" 538, and as provided in detail below, one such technique is applied that uses warping matrices (or filters) to geometrically correct the image data when such correction is needed. This image correction technique also may include a way to determine the correct trigger time of a frame if not already done so for the correlation equations. Once the images are corrected, the image data may be used for many different tasks such as for constructing 3D models of the captured scene for example, performing real distance measurements between certain object points in the captured image, using the data for artificial intelligence tasks (AI) such as computer vision, or for navigating in point of view programs to name a few examples.

Otherwise, process 500 may include "use row-based position or attitude or both and/or revised trigger time to perform application tasks" 540, and this may include a feedback control loop to the flight control of the drone itself or reconstructing undistorted image data.

Now in more detail, after calculating the correlation between the two gradient and sensed parameter datasets, and the best alignment (or final offset) is determined so that the parameters at the start of row capture times are known, correction techniques may be applied to remove the distortions from the image data.

Figure 25:
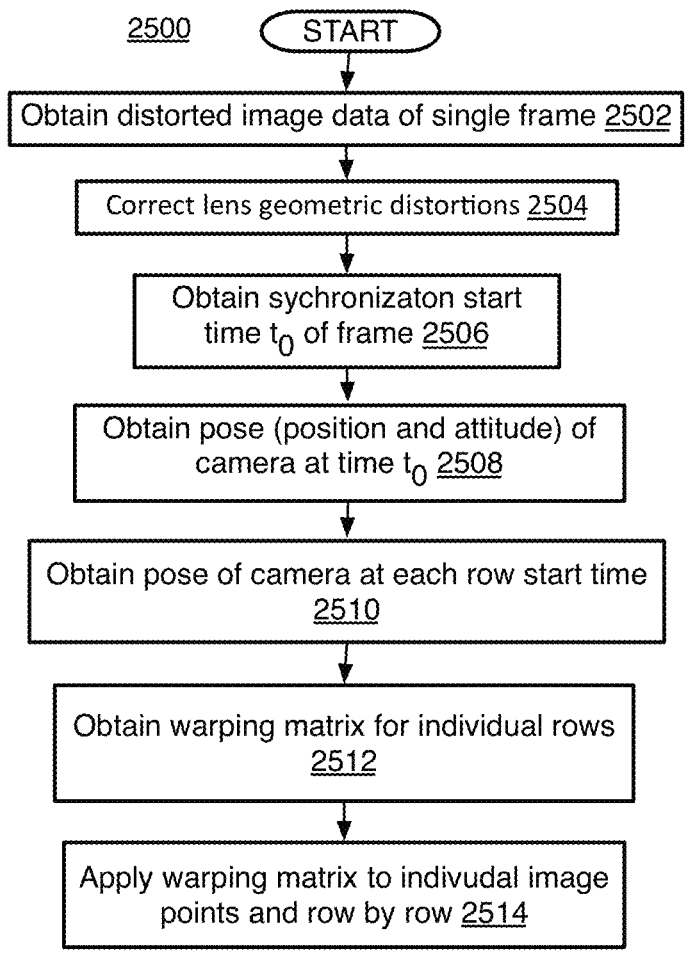
FIG. 25 is a flow chart of a method of performing rolling shutter distortion correction for image processing in accordance with at least some implementations of the present disclosure.

Referring to FIG. 25, one example process 2500 of image correction of geolocation and attitude distortions for mobile rolling shutter cameras described herein is arranged in accordance with at least some implementations of the present disclosure. In the illustrated implementation, process 2500 may include one or more operations, functions or actions as illustrated by one or more of operations 2502 to 2514 numbered evenly. By way of non-limiting example, process 2500 may be described herein with reference to image processing system 2900 (FIG. 29) described herein and where relevant.

Process 2500 may include "obtain distorted image data of single frame" 2502, and this may include obtaining raw captured data, and pre-processing the image data at least sufficiently to correlate the datasets as mentioned herein.

Process 2500 may include "correct lens geometric distortions" 2504, and here, one preliminary operation is to correct intentional lens geometric distortions by correcting intrinsic camera parameters. An example of such a lens distortion is for wide view lenses as with "barrel distortion". Mathematical models of such distortions are well known. The mathematical models are used to reconstruct the sampling points of the ideal image without the distortions, and the image is rectified by resampling at the calculated points. To perform the correction, for example, estimating the pinhole camera distortions coefficients may be performed through imaging before the mission several 'checkerboards patterns' before applying the corresponding pinhole camera model correction to the camera (see e.g. docs.opencv.org/2.4/doc/tutorials/calib3d/camera_calibration/camera_calibration.html).

For this process, it is assumed that the lens is calibrated, and removing the lens distortions will make the next steps easier. Alternatively, the lens distortion parameters could be additional free parameters to be estimated together with the rolling shutter alignment as explained below.

Process 2500 may include "obtain synchronization start time $t_0$ of frame" 2506, and this refers to obtaining the correct trigger time of the frame according to the correlated timeline. As mentioned, the trigger time may be obtained when performing the correlation as mentioned above and when available from a system or otherwise attainable by running latency tests. In some cases, the trigger time cannot be determined easily, and is yet to be obtained. In this latter case, a technique is provided below to determine the correct trigger time, and in turn, the most accurate image data correction in a trial and error type of process.

Process 2500 may include "obtain pose (position and attitude) of camera at time $t_0$" 2508 and, "obtain pose of camera at each row start time" 2510. This may involve looking up and obtaining the position and/or attitude data that was correlated, and that is now indexed at, or may be computed to be at, the trigger time and the specific row capture start times.

Process 2500 may include "obtain warping matrix for individual rows" 2512. A computation for correcting image data using warping filters or matrices (or warping model) for rolling shutter distortions was developed as follow.

Let an image point be denoted by $x=[x, y, 1]^T$ where y is the image pixel line or rolling shutter row, and x is the column. The time during capture of each row in a rolling shutter camera can be denoted by:

$$t(y, t_0) = t_0 + T\frac{y}{h} \tag{7}$$

where $t_0$ is the start of the image capture (the trigger time of the frame), T here is the time needed to capture the whole frame in the rolling shutter mode and h is the total number of image rows.

A camera geometric model projects a world 3D point X to the image pixel points x based on a known camera pose:

$$x=f(\text{pose}(t),X) \tag{8}$$

The ideal image when there is no movement during the rolling shutter period T would have all the points projected by the pose at time to. The inverse function maps the image points to 3D points:

$$X=f^{-1}(\text{pose}(t),x) \tag{9}$$

Then the ideal image where the effect of the movement is removed can be reconstructed by transforming each point x to an ideal corrected point $X_{corrected}$:

$$x_{corrected} = f\left(\text{pose}(t_0),\, f^{-1}\left(\text{pose}\left(t_0 + T\frac{y}{h}\right)\right), x\right) \quad (10)$$

For a regular pinhole camera, the correction can be written in a form of a warping 3×3 matrix W that changes per image row:

$$x_{corrected} = W\left(\text{pose}\left(t_0 + T\frac{y}{h}\right)\right)x \quad (11)$$

(see Karpenko, A., "Digital Video Stabilization and Rolling Shutter Correction using Gyroscopes", Stanford Tech Report, CTSR 2011-03 (2011)). The present method changes this technique so that it can work on a single frame thereby eliminating the requirement of multiple images and matching between images by the fact that the synchronization can be directly estimated by the aforementioned method. Here, let the inertial sensor data, e.g. gyroscope, be s(t). Then, pose changes can be computed from the inertial (attitude) sensors, and the image can be corrected using the sensor data as follows:

$$x_{corrected} = W\left(\text{pose\_inertial}\left(s\left(t_0 + T\frac{y}{h}\right)\right)\right)x \quad (12)$$

where pose_inertial (s(t)) is the pose computed from the inertial sensor data that provide attitude (roll, pitch, and yaw) values.

To determine the warping matrix W( ) for each or individual row, a calibration process is used where a set of image points is matched to their ideal positions. The matrix is chosen as the matrix that minimizes the distances of the ideal and transformed image positions of the known point. It should be noted that this process is performed without matching between images, thereby reducing memory requirements and obtaining two images of the same scene, which may not always be available.

Process 2500 then may include "apply warping matrix to individual image points and row by row" 2514, and now a different warping matrix may be applied to each row, and the same warping matrix W is applied to individual (or each) pixel locations in the row. This will change the pixel image data such as the intensity, chroma data, or both, at the pixel location, and depending on the camera parameters for that row as represented by the warping matrix, thereby removing the rolling shutter and trigger delay distortions.

Figure 26A:
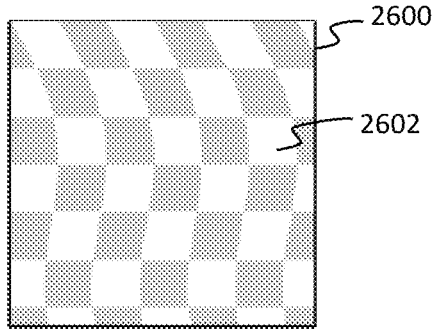
FIG. 26A is a schematic diagram of a distorted image.
Figure 26B:
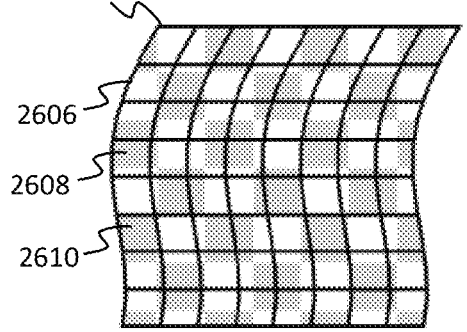
FIG. 26B is a schematic diagram of a corrected image correcting the distortion of FIG. 26A and corrected in accordance with at least one of the implementations disclosed herein.

Referring to FIGS. 26A-26B, an example image correction is illustrated where distorted image 2600 has checks 2602 in a check pattern to provide an example that is easy to visualize. The corrected image 2604 has a correction grid 2606 to show how original image data was shifted side to side to correctly align the checks 2608 into straight columns 2610.

Figure 27:
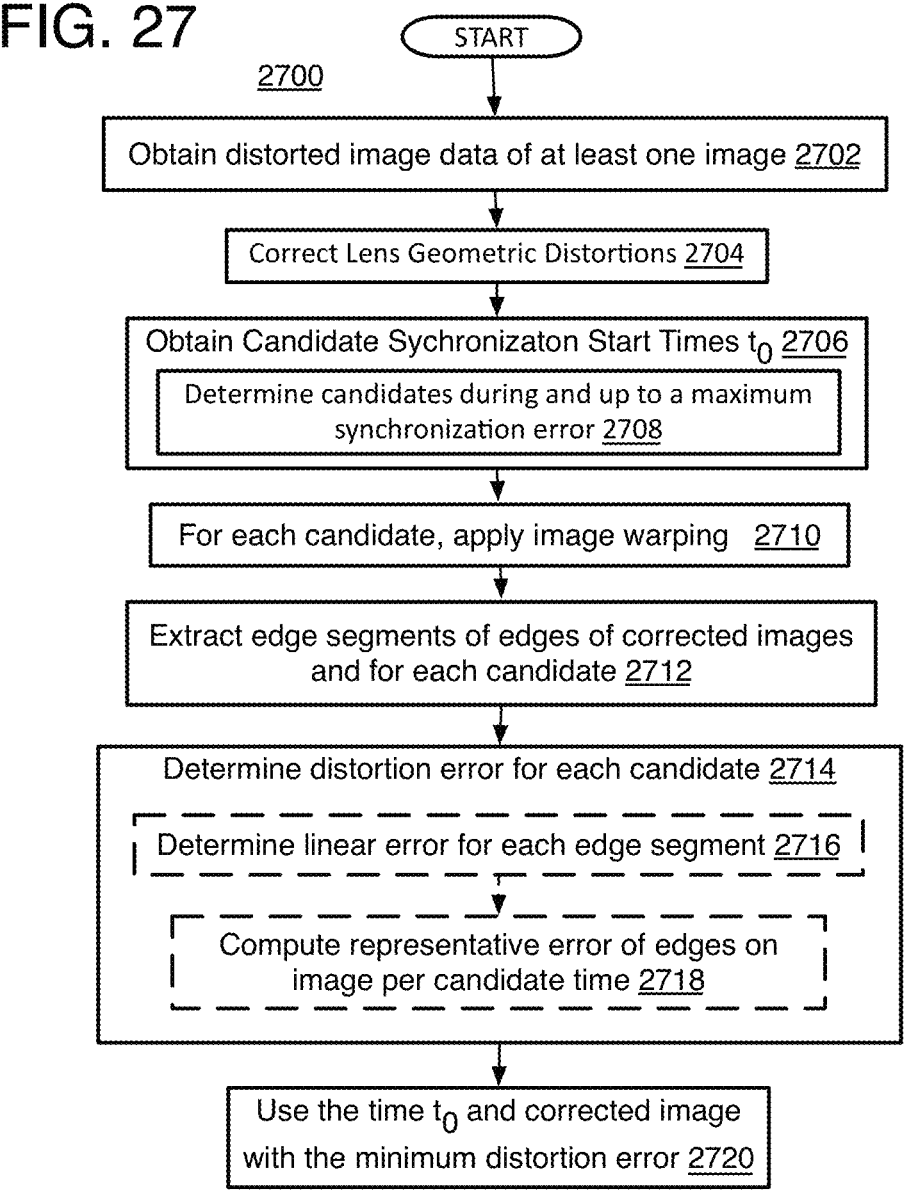
FIG. 27 is a flow chart of a method of determining image capture synchronized trigger time in accordance with at least some implementations of the present disclosure.

The correction performed on image 2600 assumes that the sensor data s(t) is synchronized with the camera trigger-command or frame capture time point, such that $t_0$ is known as mentioned above. Also, as mentioned, this will not always be the case. Thus, a process is provided for determining the correct trigger time to as follows:

Referring to FIG. 27, an example process 2700 of determining an image capture trigger time for image correction of geolocation and attitude distortions for mobile rolling shutter cameras described herein is arranged in accordance with at least some implementations of the present disclosure, and particularly when the trigger time has not been determined yet. In the illustrated implementation, process 2700 may include one or more operations, functions or actions as illustrated by one or more of operations 2702 to 2720 numbered evenly. By way of non-limiting example, process 2700 may be described herein with reference to image processing system 2900 (FIG. 29) described herein and where relevant.

Process 2700 also may include "obtain distorted image data of at least one image" 2702, and as described above for process 2500 to correct the image data.

Process 2700 may include "correct lens geometric distortions" 2704, also as mentioned above with process 2500. As described below, techniques are used that Process 2700 may include "obtain candidate synchronization start times to" 2706. Here, this operation may include "determine candidates during and up to a maximum synchronization error" 2708. By one approach, the maximum synchronization error may be computed as the time duration between two trigger times respectively of two consecutive images. This time period along the correlated timeline is then divided into intervals or samples for testing and providing candidates, such as one candidate $t_0$ every specified ms. For example, if the synchronization is between −33 and 33 ms (for 30 frame per second camera) and less than 1 ms synchronization accuracy is desired, then the interval [−33, 33] should be divided at each 1 ms giving 67 evaluation points.

Process 2700 then may include "for each candidate, apply image warping" 2710, where the warping matrices are applied for individual rows as described above, and this is repeated for each candidate $t_0$ to obtain a candidate corrected image for each trigger time $t_0$.

Once the candidate corrected images are obtained for each or individual $t_0$, the distortion is measured on each candidate corrected image. The candidate corrected image with the least distortion is then selected as the final image, and the associated trigger time $t_0$ is the final selected correct trigger time.

By one approach, and for each candidate corrected image, process 2700 may include "extract edge segments of edges of corrected images and for each candidate" 2712 to measure the distortion on an image. Known edge detection techniques may be used such as, but not limited to, canny edge detection, active contours, hough-transformation based techniques as well as gradient thresholding methods like Prewitt, Sobel or Robert's filters. This identifies a number of edges in an image, each of which may have one or more edge segments.

Process 2700 then may include "determine distortion error for each candidate" 2714. This may be accomplished by measuring how closely the extracted edge segments match a fit line when the edge is supposed to be linear, for example. See F. Devernay, F. et al., "Straight lines have to be straight: automatic calibration and removal of distortion from scenes of structured environments", Machine Vision and Applications, Springer Verlag, Vol. 13 (1), pp. 14-24 (2001). Devernay discloses distortion measurement based on edges with the assumption that the image is of man-made structures with straight lines. Despite this limitation, it has been found to be adequate here for images from drone inspection and surveying where the present method solves a different problem.

Figure 28:
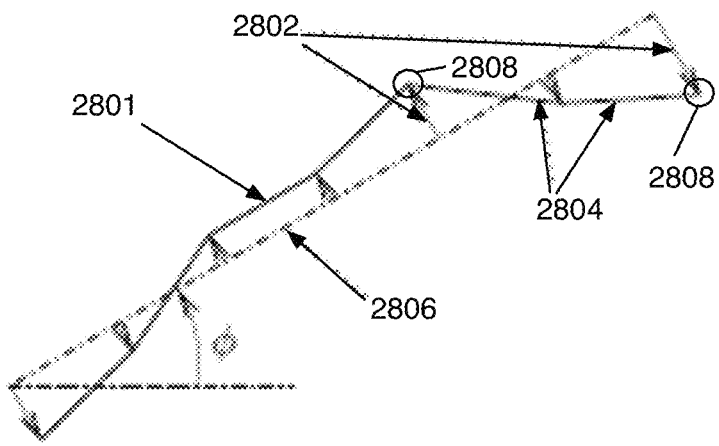
FIG. 28 is a schematic diagram to explain the method of FIG. 27.

Referring to FIG. 28, to perform the edge-based distortion measurement, this operation may include "determine linear error for each edge segment" 2716. An image diagram 2800 is a close-up of a number of detected edge segments 2804 forming an edge 2801. A fit line 2806 of the edge 2801, similar to linear regression, is determined as the least square approximation of distance to the edge segments. A least squares approximation for each edge 2801 results in a projection of the one or more 3D edge segments 2804 to the fit line.

More specifically, to determine the distortion error of the edge 2801, the sum of squares of the distances 2802 from the edgels (edge segment endpoints) 2808 of the edge segments 2804 and normal to the fit line 2806 (i.e., the $X^2$ of the least square approximation) is computed (which may be considered a projection of the edge segment 2804 to the fit line 2806). That way, the error is zero if the edge 2801 lies exactly on a fit line 2806, and the larger the curvature of the edge 2801, the larger the distortion error. To state it another way, the distortion error of an edge 2801 is the sum of squares of the distances 2802 from the edgels 2808 of the edge segments 2804 of the edge 2801 to the least square fit of a fit line 2806 to these edgels.

This operation then may include "compute representative error of edges on image per candidate time" 2718. The final distortion for the candidate corrected image may be an average over all detected edges (or edge fit lines) in an image, although other combinations could be used such as taking the median or one (or any combination) of the best candidates edges, or otherwise a robust average calculation technique such as M-estimator.

Process 2700 then may include "use the time $t_0$ and corrected image with the minimum distortion error" 2720. Thus, the $t_0$ that has the minimum distortion error is selected as the correct trigger time, with the best corrected image.

As another alternative, it will be appreciated that a combination of the method presented here and the method of lens correction in Devernay could be used together rather than removing the lens distortion ahead of time as described above.

In addition, any one or more of the operations of the processes in FIGS. 4, 5A-5B, and 27-28 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (Sock), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (Sock), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 29:
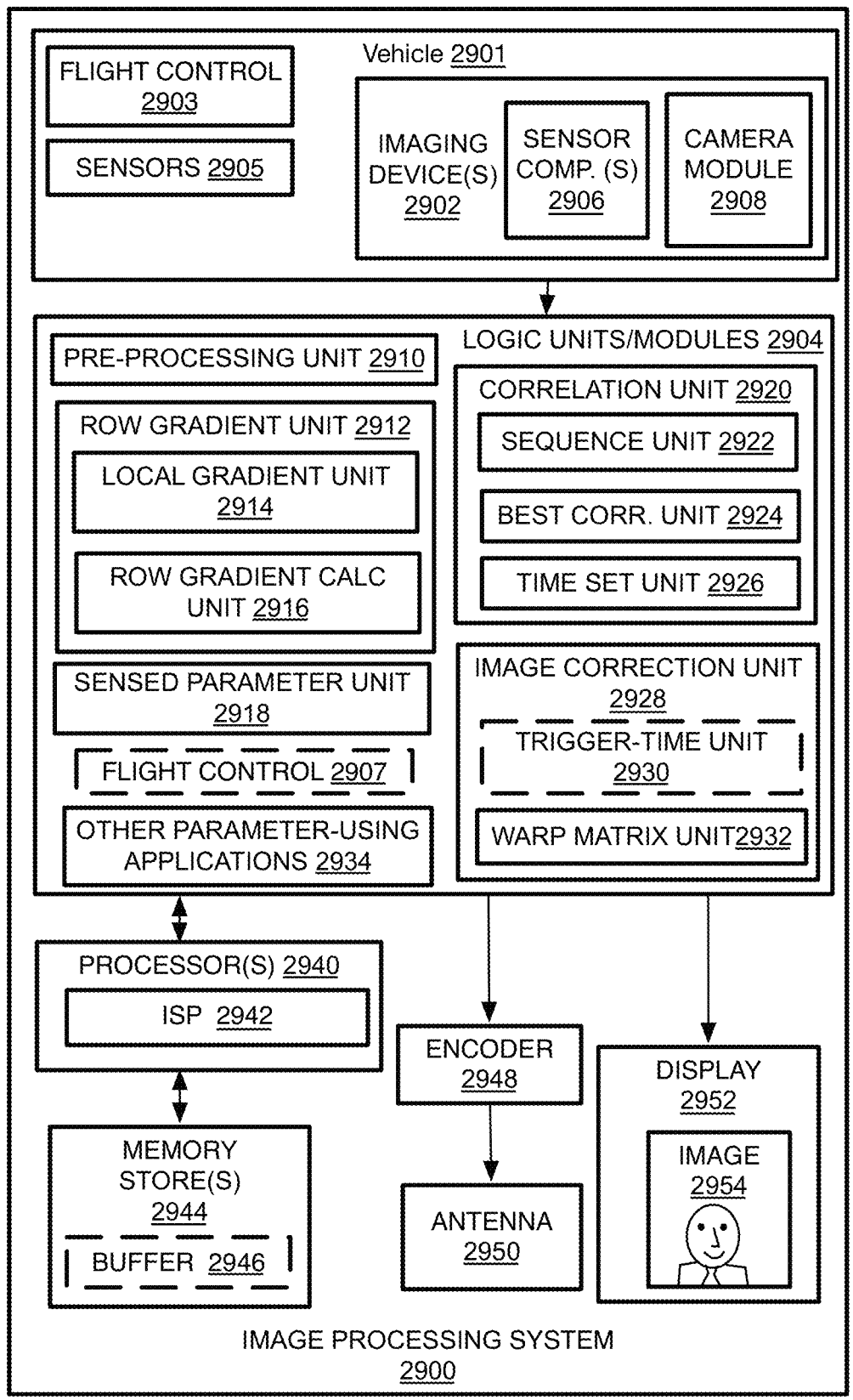
FIG. 29 is a schematic diagram of an example image processing system in accordance with at least one of the implementations disclosed herein.

Referring to FIG. 29, an example image processing system 2900 is arranged in accordance with at least some implementations of the present disclosure. In various implementations, the example image processing system 2900 may have an imaging device 2902 to form or receive captured image data, and a vehicle 2901 to carry components of the imaging device 2902. This can be implemented in various ways. Thus, in one form, the image processing system 2900 may be a mobile digital camera or other image capture device, and imaging device 2902, in this case, may be the camera hardware and camera sensor software, module, or component 2908. In this case, the camera 2902 with the logic 2904 is physically located on a vehicle 2901 such as a drone by one example. In other examples, imaging processing system 2900 may have a mobile imaging device 2902 on a vehicle 2901 as a drone and that includes or may be a camera, and logic modules 2904 may communicate remotely with, or otherwise may be communicatively coupled to, the imaging device 2902 for further processing of the image data.

In either case, such technology may include a camera such as a digital camera system, a dedicated camera device, or even an imaging phone, whether a still picture or video camera or some combination of both. Thus, in one form, imaging device 2902 may include camera hardware and optics including one or more camera sensors as well as auto-focus, zoom, aperture, ND-filter, auto-exposure, flash, and actuator controls. These controls may be part of a sensor module or component 2906 for operating the sensor. The camera sensor component 2906 may be part of the imaging device 2902, or may be part of the logical modules 2904 or both. Such camera sensor component can be used to generate images for a viewfinder and take still pictures or video. The imaging device 2902 also may have a lens, an image sensor with a RGB Bayer color filter, an analog amplifier, an A/D converter, other components to convert incident light into a digital signal, the like, and/or combinations thereof. The digital signal also may be referred to as the raw image data herein. The camera also may have an optical axis that is fixed or movable relative to the vehicle 2901 but is otherwise at a known and determinable position.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor supports rolling shutters either alone or in combination with other types of electronic shutters, such as a global shutter in addition to a rolling shutter. In other examples, an RGB-Depth camera and/or microphone-array might be used in addition to or in the alternative to a camera sensor. In some examples, imaging device 2902 may be provided with an eye tracking camera.

The vehicle 2901 may be a drone, land, sea, or space vehicle, and may have flight control 2903 aboard the vehicle for implementing motion-related commands. The commands may or may not originate from the on-board flight control unit 2903. The vehicle 2901 also may have sensors 2905 including inertial sensors such as gyroscopes, GPS sensors for global and local positioning and any other sensor that may be helpful to determine the parameters (position and attitude) of the vehicle. A flight control 2907 also may be considered part of the logic modules 2904, which could be on-broad or remote from the vehicle 2901. The flight control 2907 may originate commands for the vehicle either automatically or through an interface receiving commands from a user. Many examples are contemplated and are not particularly limited here as long as sensed parameter data of the vehicle can be generated and received for the correlation mentioned herein.

In the illustrated example, the logic modules 2904 may include a pre-processing unit 2910 that receives and processes raw image data, a row gradient unit 2912 with a local gradient unit 2914 and a row gradient calculation unit 2916. A sensed parameter unit 2918 receives and/or computes sensed parameter data values along a received sensed parameter timeline. A correlation unit 2920 has a sequence unit 2922, a best correlation unit 2924, and a time set unit 2926 to perform the correlation and other time-related tasks, such as setting correlated trigger times for example, as mentioned above. An image correction unit 2928 may have a trigger-time unit 2930 used when the trigger time is not set by the correlation unit, and a warp matrix unit 2932. Another parameter-using applications unit 2934 may be provided and has applications that use the correlated row-to-parameter data as well. The logic modules 2904 may be communicatively coupled to the imaging device 2902 in order to receive the raw image data and sensor data. Otherwise, a memory store(s) 2944 may be provided to store image and sensor data a buffer 2946, which may be formed of RAM such as DRAM.

The image processing system 2900 may have one or more of the processors 2940 which may include the dedicated image signal processor (ISP) 2942 such as the Intel Atom, memory stores 2944, one or more displays 2952, encoder 2948, and antenna 2950. In one example implementation, the image processing system 2900 may have the display 2952, at least one processor 2940 communicatively coupled to the display, at least one memory 2944 communicatively coupled to the processor and having the buffer 2946 by one example for storing the image and sensor data. The encoder 2948 and antenna 2950 may be provided to compress the modified image date for transmission to other devices that may display or store the image. It will be understood that the image processing system 2900 also may include a decoder (or encoder 2948 may include a decoder) to receive and decode image data for processing by the system 2900. Otherwise, the processed image 2954 may be displayed on display 2952 or stored in memory 2944. As illustrated, any of these components may be capable of communication with one another and/or communication with portions of logic modules 2904 and/or imaging device 2902. Thus, processors 2940 may be communicatively coupled to the image device 2902, the vehicle 2901, and the logic modules 2904 for operating those components. By one approach, although image processing system 2900, as shown in FIG. 29, may include one particular set of blocks or actions associated with particular components or modules, these blocks or actions may be associated with different components or modules than the particular component or module illustrated here.

Figure 30:
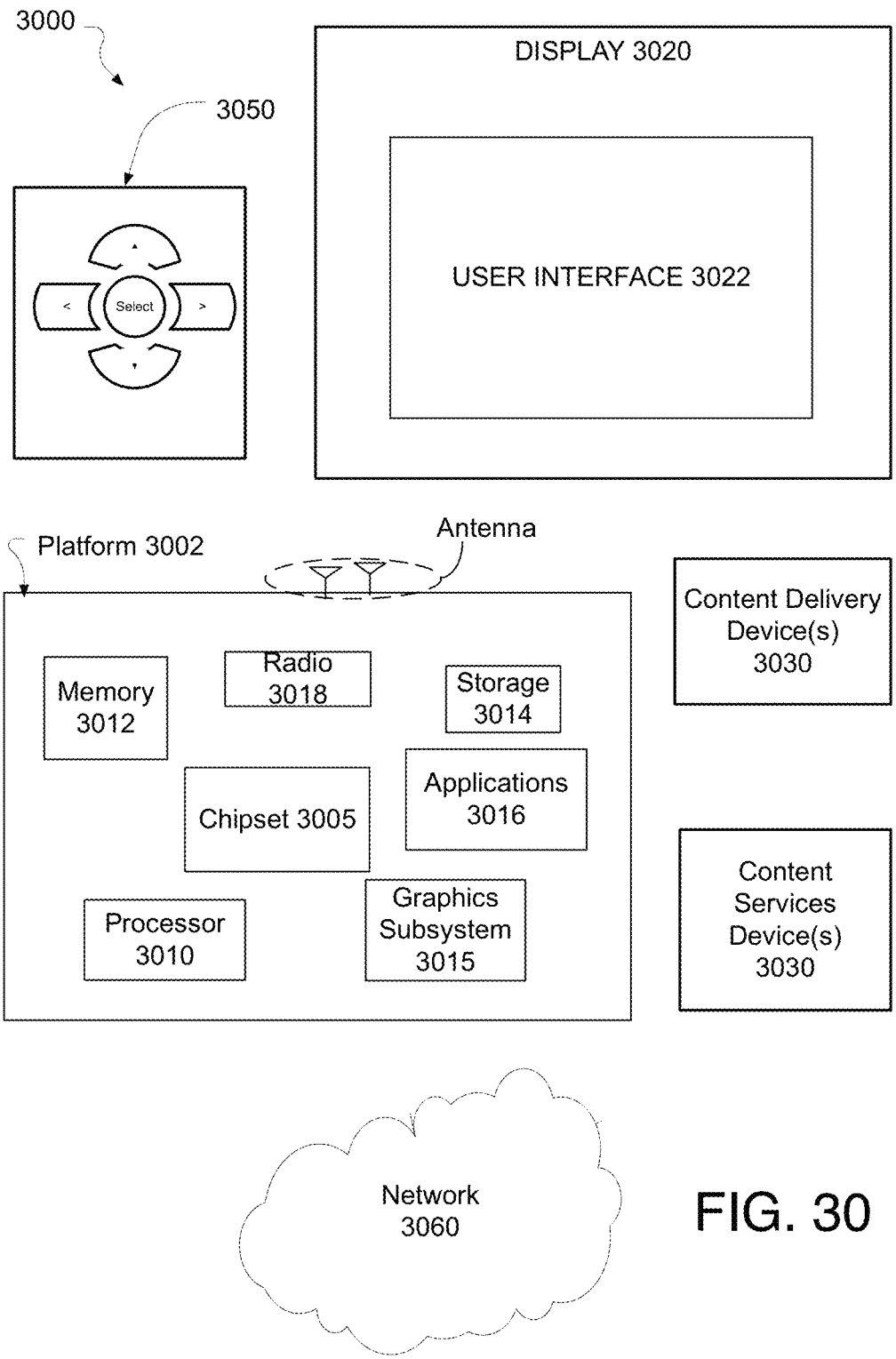
FIG. 30 is a schematic diagram of another example system.

Referring to FIG. 30, an example system 3000 in accordance with the present disclosure operates one or more aspects of the image processing system described herein. It will be understood from the nature of the system components described below that such components may be associated with, or used to operate, certain part or parts of the image processing system described above. In various implementations, system 3000 may be a media system although system 3000 is not limited to this context. For example, system 3000 may be incorporated into a digital still camera, digital video camera, mobile device with camera or video functions such as a drone, helicopter, or airplane, ground vehicles such as people-carrying life-size or miniature size automobiles or trucks, sea vehicles such as boats and so forth, and even space vehicles. Otherwise, the mobile device may be an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 3000 includes a platform 3002 coupled to a display 3020. Platform 3002 may receive content from a content device such as content services device(s) 3030 or content delivery device(s) 3040 or other similar content sources. A navigation controller 3050 including one or more navigation features may be used to interact with, for example, platform 3002 and/or display 3020. Each of these components is described in greater detail below.

In various implementations, platform 3002 may include any combination of a chipset 3005, processor 3010, memory 3012, storage 3014, graphics subsystem 3015, applications 3016 and/or radio 3018. Chipset 3005 may provide intercommunication among processor 3010, memory 3012, storage 3014, graphics subsystem 3015, applications 3016 and/or radio 3018. For example, chipset 3005 may include a storage adapter (not depicted) capable of providing intercommunication with storage 3014.

Processor 3010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 3010 may be dual-core processor(s), dual-core mobile processor(s), and so forth.

Memory 3012 may be implemented as a volatile memory device such as, but not limited to, a Random Access Memory (RAM), Dynamic Random Access Memory (DRAM), or Static RAM (SRAM).

Storage 3014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 3014 may include technology to increase the storage performance enhanced protection for valuable digital media when multiple hard drives are included, for example.

Graphics subsystem 3015 may perform processing of images such as still or video for display. Graphics subsystem 3015 may be a graphics processing unit (GPU) or a visual processing unit (VPU), for example. An analog or digital interface may be used to communicatively couple graphics subsystem 3015 and display 3020. For example, the interface may be any of a High-Definition Multimedia Interface, Display Port, wireless HDMI, and/or wireless HD compliant techniques. Graphics subsystem 3015 may be integrated into processor 3010 or chipset 3005. In some implementations, graphics subsystem 3015 may be a stand-alone card communicatively coupled to chipset 3005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 3018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 3020 may include any television type monitor or display. Display 3020 may include, for example, a computer display screen, touch screen display, video monitor, television-like device, and/or a television. Display 3020 may be digital and/or analog. In various implementations, display 3020 may be a holographic display. Also, display 3020 may be a transparent surface that may receive a visual projection. Such projections may convey various forms of information, images, and/or objects. For example, such projections may be a visual overlay for a mobile augmented reality (MAR) application. Under the control of one or more software applications 3016, platform 3002 may display user interface 3022 on display 3020.

In various implementations, content services device(s) 3030 may be hosted by any national, international and/or independent service and thus accessible to platform 3002 via the Internet, for example. Content services device(s) 3030 may be coupled to platform 3002 and/or to display 3020. Platform 3002 and/or content services device(s) 3030 may be coupled to a network 3060 to communicate (e.g., send and/or receive) media information to and from network 3060. Content delivery device(s) 3040 also may be coupled to platform 3002 and/or to display 3020.

In various implementations, content services device(s) 3030 may include a cable television box, personal computer, network, telephone, Internet enabled devices or appliance capable of delivering digital information and/or content, and any other similar device capable of unidirectionally or bidirectionally communicating content between content providers and platform 3002 and/display 3020, via network 3060 or directly. It will be appreciated that the content may be communicated unidirectionally and/or bidirectionally to and from any one of the components in system 3000 and a content provider via network 3060. Examples of content may include any media information including, for example, video, music, medical and gaming information, and so forth.

Content services device(s) 3030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 3002 may receive control signals from navigation controller 3050 having one or more navigation features. The navigation features of controller 3050 may be used to interact with user interface 3022, for example. In embodiments, navigation controller 3050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 3050 may be replicated on a display (e.g., display 3020) by movements of a pointer, cursor, focus ring, or other visual indicators displayed on the display. For example, under the control of software applications 3016, the navigation features located on navigation controller 3050 may be mapped to virtual navigation features displayed on user interface 3022, for example. In embodiments, controller 3050 may not be a separate component but may be integrated into platform 3002 and/or display 3020. The present disclosure, however, is not limited to the elements or in the context shown or described herein.

In various implementations, drivers (not shown) may include technology to enable users to instantly turn on and off platform 3002 like a television with the touch of a button after initial boot-up, when enabled, for example. Program logic may allow platform 3002 to stream content to media adaptors or other content services device(s) 3030 or content delivery device(s) 3040 even when the platform is turned "off." In addition, chipset 3005 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 3000 may be integrated. For example, platform 3002 and content services device(s) 3030 may be integrated, or platform 3002 and content delivery device(s) 3040 may be integrated, or platform 3002, content services device(s) 3030, and content delivery device(s) 3040 may be integrated, for example. In various embodiments, platform 3002 and display 3020 may be an integrated unit. Display 3020 and content service device(s) 3030 may be integrated, or display 3020 and content delivery device(s) 3040 may be integrated, for example. These examples are not meant to limit the present disclosure.

In various embodiments, system 3000 may be implemented as a wireless system, a wired system, or a combination of both. When implemented as a wireless system, system 3000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 3002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 30.

Figure 31:
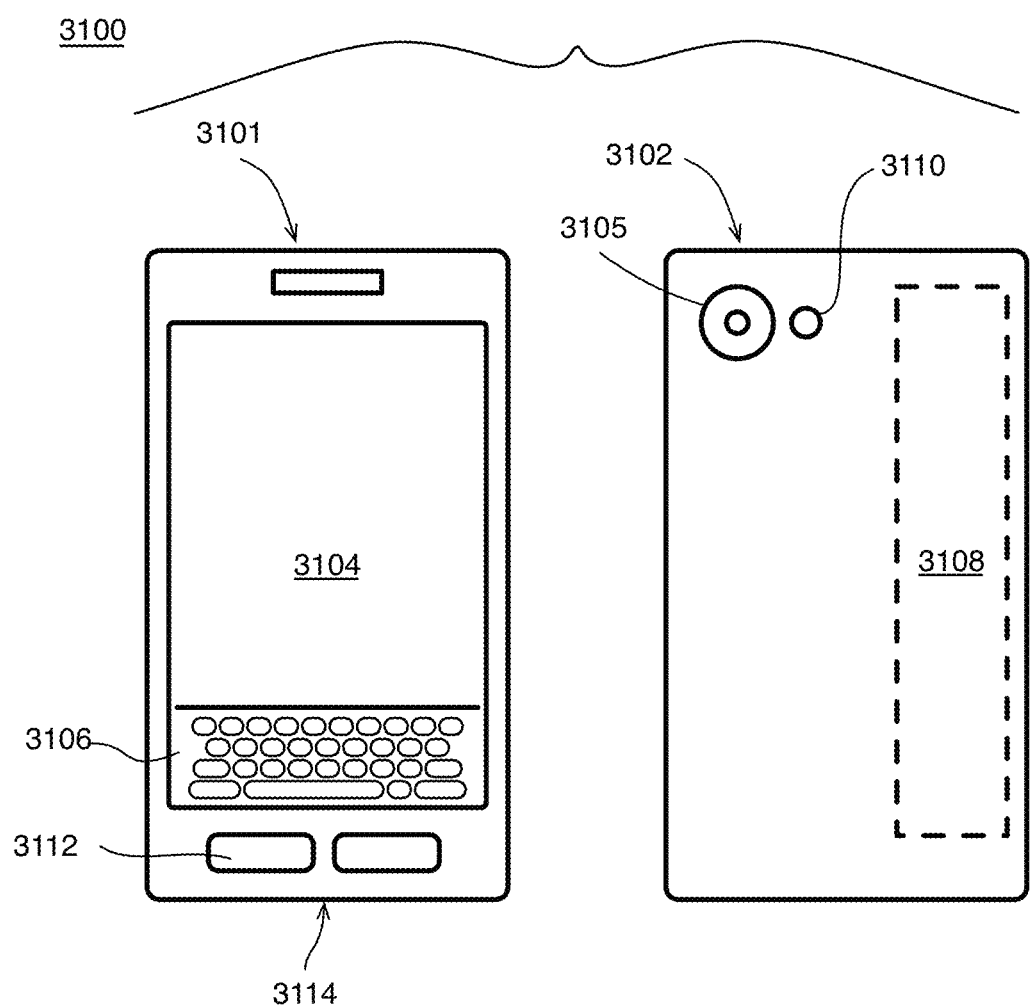
FIG. 31 is an illustrative diagram of an example system, all arranged in accordance with at least some implementations of the present disclosure.

Referring to FIG. 31, a small form factor device 3100 is one example of the varying physical styles or form factors in which systems 2900 or 3000 may be embodied. By this approach, device 3100 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 31, device 3100 may include a housing with a front 3101 and a back 3102. Device 3100 includes a display 3104, an input/output (I/O) device 3106, and an integrated antenna 3108. Device 3100 also may include navigation features 3112. I/O device 3106 may include any suitable I/O device for entering information into a mobile computing device. Examples for I/O device 3106 may include an alphanumeric keyboard, a numeric keypad, a touch pad, input keys, buttons, switches, microphones, speakers, voice recognition device and software, and so forth. Information also may be entered into device 3100 by way of microphone 1314, or may be digitized by a voice recognition device. As shown, device 3100 may include a camera 3105 (e.g., including at least one lens, aperture, and imaging sensor) and a flash 3110 integrated into back 3102 (or elsewhere) of device 3100. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of point registration for image processing comprises capturing image data of at least one frame with a rolling shutter of at least one moving camera; determining row-based distortions of individual rolling shutter rows of pixel image data forming a part of the frame and by using the image data and that indicate a direction of travel or attitude of the camera when the rolling shutter row captured part of the image data; correlating the row-based distortions with sensed camera parameter data of one or more parameters of the at least one moving camera to determine a best correlation to form a correlated timeline; and correcting the image data of the frame by using the correlated timeline.

By another implementation, the method may include wherein the distortions are associated with gradients of image data representing a rolling shutter row; wherein the distortions comprise an average row gradient orientation that is the average of local gradient orientations of pixel locations along the same rolling shutter row; the method comprising using a 3×3 filter matrix to determine the local gradient orientations and using a pixel data of a row above and below a current row being analyzed, wherein the filter matrix is a Sobel filter matrix, and the method comprises using x and y component Sobel filter matrices to form the local gradient orientations; combining the components to form a single row gradient orientation of individual rolling shutter rows; and averaging the local gradient orientations to form the average gradient orientation of the row by using complex numbers wherein the modulus is the gradient intensity and the argument is the gradient orientation. The parameters may include at least one of roll, yaw, pitch, cross-track translation, and along-track translation; and the method comprises correlating the gradient orientations with the parameter data without converting the gradient orientations and the parameter data to the same parameter type of the other of the gradient orientations or the parameter data; and performing cross-correlation to perform the correlating, wherein the correcting comprises determining a trigger time that is the time of the command to capture a single image and according to the correlated timeline, and wherein the correcting comprises applying a row warping matrix determined depending on a position or attitude or both of a row and applied to distorted image data along the row to generate a corrected image, wherein the warping matrix differs from row to row.

By a further implementation, a non-transitory computer-implemented system of at least one movable image capture device with a rolling shutter to capture at least one frame of image data while the camera is moving; memory communicatively coupled to hold image data of the at least one frame; and at least one processor communicatively coupled to the image capture device and being arranged to operate by: determining row-based distortions of individual rolling shutter rows of pixel image data forming a part of the frame and by using the image data and that indicate a direction of travel or attitude of the camera when the rolling shutter row captured part of the image data; correlating the row-based distortions with sensed camera parameter data of one or more parameters of the at least one moving camera to determine a best correlation to form a correlated timeline; and correcting the image data of the frame by using the correlated timeline.

As a further implementation, the system may operate wherein correlating comprises performing a cross-correlation with data of each sensed parameter separately with the row-based distortions, selecting a greatest parameter correlation of each parameter, and selecting one of the greatest parameter correlations as the best correlation; wherein the greatest parameter correlation with the absolute highest correlation value is selected as the best correlation; wherein correlating comprises temporally correlating a distortion timeline of the distortions to a timeline of the sensed camera parameter data; wherein the distortion timeline is factored by limiting a domain of the correlation at least partly based on the delay from a trigger time to a time that is a start of exposure of a row; wherein the amount of time of the delay is predetermined before a flight capturing the image data; and wherein the at least one processor is arranged to operate by applying a warping matrix of individual rows to correct the image data of a row, and the warping matrix being generated by using a camera position or attitude or both of the row.

As another implementation, an article having a non-transitory computer readable medium comprises a plurality of instructions that in response to being executed on a computing device, cause the computing device to operate by: receiving captured image data of at least one frame and captured with a rolling shutter of at least one moving camera; determining row-based distortions of individual rolling shutter rows of pixel image data forming a part of the frame and by using the image data and that indicate a direction of travel or attitude of the camera when the rolling shutter row captured part of the image data; correlating the row-based distortions with sensed camera parameter data of one or more parameters of the at least one moving camera to determine a best correlation to form a correlated timeline; and correcting the image data of the frame by using the correlated timeline.

As another option, the instructions cause the computing device to operate by performing the correcting comprising: obtaining a synchronized trigger time that is the start time of the capture of a single frame; determining the row position or attitude or both of the at least one camera during capture of individual rows of the pixel locations of the single frame and depending on the synchronized start time; determining a warping matrix of individual rows of the single frame by using the row position or attitude or both; and applying one of the warping matrices each to a different row and to individual pixel locations along the row and to the distorted image data; wherein obtaining a synchronized trigger time is determined depending on the correlated timeline; wherein the determining and applying of warping matrices is repeated for a number of candidate trigger times and to the same single frame, the applying of the warping matrices resulting in a candidate corrected frame for each candidate trigger time; and the instructions causing the computing device to operate by: determining a distortion error of each candidate corrected frame; and selecting the candidate trigger time as the synchronized trigger time that obtains the minimum distortion error of the candidate corrected frames; wherein distortion error is determined by extracting edge segments of the candidate corrected frame; determining a linear error for individual edge segments; and computing a representative error of the individual candidate corrected image; and wherein the representative error is based at least in part on a least squares approximation of the edge segments relative to a line.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image processing, comprising:
    capturing image data of at least one frame with a rolling shutter of at least one moving camera;
    determining row-based distortions of individual rolling shutter rows of pixel image data forming a part of the frame and by using the image data of color or brightness-related values and that indicate a direction of travel or attitude of the camera when the rolling shutter row captured part of the image data, wherein the distortions indicate a difference in pixel position caused by a position or attitude of the at least one moving camera from a time of triggering an image capture to a time of capturing the image capture;
    correlating the row-based distortions with sensed camera parameter data of one or more parameters of the at least one moving camera to determine a best correlation to form a correlated timeline; and
    correcting the image data of the frame by using the correlated timeline.

2. The method of claim 1 wherein the distortions are associated with gradients of image data representing a rolling shutter row.

3. The method of claim 1 wherein the distortions comprise an average row gradient orientation that is the average of local gradient orientations of pixel locations along the same rolling shutter row.

4. The method of claim 3 comprising using a 3×3 filter matrix to determine the local gradient orientations and using a pixel data of a row above and below a current row being analyzed.

5. The method of claim 4 wherein the filter matrix is a Sobel filter matrix.

6. The method of claim 3 comprising using x and y component Sobel filter matrices to form the local gradient orientations; and combining the components to form a single row gradient orientation of individual rolling shutter rows.

7. The method of claim 3 comprising averaging the local gradient orientations to form the average gradient orientation of the row by using complex numbers wherein the modulus is the gradient intensity and the argument is the gradient orientation.

8. The method of claim 1 wherein the parameters include at least one of roll, yaw, pitch, cross-track translation, and along-track translation.

9. The method of claim 1 wherein the correlating comprises correlating the row-based distortions in the form of gradient orientations with the parameter data without converting the gradient orientations and the parameter data to the same parameter type of the other of the gradient orientations or the parameter data.

10. The method of claim 1 comprising performing cross-correlation to perform the correlating.

11. The method of claim 1 wherein the correcting comprises determining a trigger time that is the time of the command to capture a single image and according to the correlated timeline.

12. The method of claim 1 wherein the correcting comprises applying a row warping matrix determined depending on a position or attitude or both of a row and applied to distorted image data along the row to generate a corrected image, wherein the warping matrix differs from row to row.

13. A system for image processing, comprising:
    at least one movable image capture device with a rolling shutter to capture at least one frame of image data while the camera is moving;
    memory communicatively coupled to hold image data of the at least one frame; and
    at least one processor communicatively coupled to the image capture device and being arranged to operate by:
        determining row-based distortions of individual rolling shutter rows of pixel image data forming a part of the frame and by using the image data of color or brightness-related values that indicate a direction of travel or attitude of the camera when the rolling shutter row captured part of the image data;
        correlating the row-based distortions with sensed camera parameter data of one or more parameters of the at least one moving camera to determine a best correlation to form a correlated timeline; and
        correcting the image data of the frame by using the correlated timeline.

14. The system of claim 13 wherein correlating comprises performing a cross-correlation with data of each sensed parameter separately with the row-based distortions, selecting a greatest parameter correlation of each parameter, and selecting one of the greatest parameter correlations as the best correlation.

15. The system of claim 14 wherein the greatest parameter correlation with the absolute highest correlation value is selected as the best correlation.

16. The system of claim 13 wherein correlating comprises temporally correlating a distortion timeline of the distortions to a timeline of the sensed camera parameter data.

17. The system of claim 16 wherein the distortion timeline is factored by limiting a domain of the correlation at least partly based on the delay from a trigger time to a time that is a start of exposure of a row.

18. The system of claim 17 wherein the amount of time of the delay is predetermined before a flight capturing the image data.

19. The system of claim 13 wherein the at least one processor is arranged to operate by applying a warping matrix of individual rows to correct the image data of a row, and the warping matrix being generated by using a camera position or attitude or both of the row.

20. An article having a non-transitory computer readable medium comprising a plurality of instructions that in response to being executed on a computing device, cause the computing device to operate by:

receiving captured image data of at least one frame and captured with a rolling shutter of at least one moving camera;

determining row-based distortions of individual rolling shutter rows of pixel image data forming a part of the frame and by using color or brightness-related values of the image data that indicate a direction of travel or attitude of the camera when the rolling shutter row captured part of the image data;

correlating the row-based distortions with sensed camera parameter data of one or more parameters of the at least one moving camera to determine a best correlation to form a correlated timeline; and correcting the image data of the frame by using the correlated timeline.

21. The article of claim 20 wherein the correcting comprising:

obtaining a synchronized trigger time that is the start time of the capture of a single frame;

determining the row position or attitude or both of the at least one camera during capture of individual rows of the pixel locations of the single frame and depending on the synchronized start time;

determining a warping matrix of individual rows of the single frame by using the row position or attitude or both; and applying one of the warping matrices each to a different row and to individual pixel locations along the row and to the distorted image data.

22. The article of claim 21 wherein obtaining a synchronized trigger time is determined depending on the correlated timeline.

23. The article of claim 21 wherein the determining and applying of warping matrices is repeated for a number of candidate trigger times and to the same single frame, the applying of the warping matrices resulting in a candidate corrected frame for each candidate trigger time; and the instructions causing the computing device to operate by:

determining a distortion error of each candidate corrected frame; and selecting the candidate trigger time as the synchronized trigger time that obtains the minimum distortion error of the candidate corrected frames.

24. The article of claim 23 wherein distortion error is determined by extracting edge segments of the candidate corrected frame; determining a linear error for individual edge segments; and computing a representative error of the individual candidate corrected image.

25. The article of claim 24 wherein the representative error is based at least in part on a least squares approximation of the edge segments relative to a line.

* * * * *